United States Patent
Sato et al.

(10) Patent No.: US 8,484,329 B2
(45) Date of Patent: Jul. 9, 2013

(54) DEVICE MANAGEMENT SYSTEM

(75) Inventors: Toshitaka Sato, Ibaraki (JP); Hideki Fujimura, Neyagawa (JP); Masayuki Amano, Hirakata (JP); Yuuki Kasai, Beijing (CN)

(73) Assignee: Panasonic Corporation, Osaka (JP)

( * ) Notice: Subject to any disclaimer, the term of this patent is extended or adjusted under 35 U.S.C. 154(b) by 599 days.

(21) Appl. No.: 12/672,340

(22) PCT Filed: Aug. 6, 2008

(86) PCT No.: PCT/JP2008/064138
§ 371 (c)(1),
(2), (4) Date: Jun. 16, 2010

(87) PCT Pub. No.: WO2009/020158
PCT Pub. Date: Feb. 12, 2009

(65) Prior Publication Data
US 2012/0004739 A1    Jan. 5, 2012

(30) Foreign Application Priority Data

Aug. 6, 2007  (JP) ................................ 2007-204570
Jan. 18, 2008  (JP) ................................ 2008-009827

(51) Int. Cl.
*G06F 15/16* (2006.01)
(52) U.S. Cl.
USPC .................................. 709/223; 700/8; 700/9
(58) Field of Classification Search
USPC .......................................... 709/223; 700/8, 9
See application file for complete search history.

(56) References Cited

U.S. PATENT DOCUMENTS

| 6,115,713 | A  | * | 9/2000  | Pascucci et al. ........................ 1/1 |
| 6,477,434 | B1 | * | 11/2002 | Wewalaarachchi et al. ..... 700/83 |
| 7,516,106 | B2 | * | 4/2009  | Ehlers et al. .................. 705/412 |
| 7,634,555 | B1 | * | 12/2009 | Wainscott et al. ............. 709/223 |
| 7,788,189 | B2 | * | 8/2010  | Budike, Jr. .................... 705/400 |
| 7,941,489 | B2 | * | 5/2011  | LaMothe et al. .............. 709/206 |
| 2002/0016639 | A1 | * | 2/2002 | Smith et al. ....................... 700/9 |

FOREIGN PATENT DOCUMENTS

| JP | 4-154397 A  | 5/1992 |
| JP | 8-65759 A   | 3/1996 |
| JP | 10-98778 A  | 4/1998 |
| JP | 10-262048   | 9/1998 |

(Continued)

OTHER PUBLICATIONS

International Search Report for the Application No. PCT/JP2008/064138 mailed Sep. 9, 2008.

(Continued)

*Primary Examiner* — Kevin Bates
(74) *Attorney, Agent, or Firm* — Renner, Otto, Boisselle & Sklar, LLP

(57) ABSTRACT

A device management system has lighting device controlling units and measurement management units, each of which is disposed in each sub area. In addition, the lighting device controlling units and the measurement management units are configured to communicate with an area unit which is disposed in each sub area. The area unit is configured to communicate with the lighting device controlling units and the measurement management units via a communication packet. The area unit further has a router which is configured to prevent the communication packet from leaking to the communication network having an upper management device in the high hierarchy level. The area unit is configured to communicate with the upper management device through the router.

13 Claims, 12 Drawing Sheets

FOREIGN PATENT DOCUMENTS

| | | |
|---|---|---|
| JP | 2005-217481 A | 8/2005 |
| JP | 2006-108927 A | 4/2006 |
| JP | 2006-129283 A | 5/2006 |
| JP | 2007-174435 A | 7/2007 |
| WO | 2006/095315 A1 | 9/2006 |

OTHER PUBLICATIONS

Japanese Office Action for corresponding Japanese Application No. 2008-009827 dated Jan. 29, 2013.

* cited by examiner

Fig. 4(a)

| Global Group name | Definition |
| --- | --- |
| G1 | Lighting device-1-g1, Lighting device-2-g3 |
| G2 | Lighting device-2-g4 |
| ..... | ..... |

Fig. 4 (b)

| Global Group name | Definition |
| --- | --- |
| g1 | 1,2,3,4 |
| g2 | 5,6,7,8 |
| g3 | 9,10,11,12 |
| g4 | 13,14,15,16 |
| ..... | ..... |

Fig. 11

| Source ID | Destination ID | Command | Command data 1 | Command data 2 | ... | Command data n |

DEVICE MANAGEMENT SYSTEM

TECHNICAL FIELD

This invention relates to a device management system suitable for management (monitor and control) of the devices disposed in a large-scale management area such as buildings. In addition, this invention also relates to a network communication device suitable for the device management system.

BACKGROUND ART

Japanese patent application publication No. 2006-129283A, hereinafter referred to as Patent literature 1, discloses a prior device management system for managing a plurality of devices via communication network. In the prior communication network, the communication network in the high hierarchy level is configured to manage the communication network in the low hierarchy level. Each the communication network in the low hierarchy level groups a plurality of the devices having functions same to each other. The communication networks are disposed in predetermined locations respectively. The communication network in the high hierarchy level is configured to select one of a plurality of the communication networks in the low hierarchy levels, and is configured to manage the communication network in the low hierarchy level. The prior communication network has a gateway. The gateway is configured to intermediate between the communication network in the high hierarchy level and the communication networks in the low hierarchy level. The gateway is provided with a protocol converter which is configured to convert a first communication protocol of the high communication network into a second communication protocol, and which is also configured to convert the second communication protocol into the first communication protocol. The first communication protocol is exemplified by BACnet (A Data Communication Protocol for Building Automation and Control Network). The second communication protocol is exemplified by LonWorks (registered trademark).

The gateway is provided with a plurality of communication units which is connected to the communication network in the low hierarchy level. The gateway is configured to activate one of the communication units selectively. This configuration makes it possible to manage a plurality of the devices over limitation of the number of the devices of the communication network in the high hierarchy network even if the number of the devices of the communication network in the low communication network is limited. In a case where the system is required to manage a plurality of the devices exceeding the limitation of the number of the devices of the communication network in the low hierarchy level, it is possible for the gateway to manage the devices over the limitation of the communication network in the low hierarchy level if the gateway has an empty communication unit.

DISCLOSURE OF THE INVENTION

The prior communication network has a logically hierarchized structure. The prior communication network of the lower hierarchy is constructed by the distributed control network. Therefore, the communication network operates autonomously even if the communication network in the low hierarchy level is separated from the gateway. By the way, in order to manage the building, it is required to construct the one communication network in the low hierarchy level. However, the prior communication network is not designed to construct a multi hierarchy level. Therefore, it is difficult to construct a system having a multi hierarchy level in order to manage a plurality of devices disposed in a management area over a wide range. When the communication network having the multi hierarchy level is constructed by the Patent literature 1, it is necessary for the communication network to have a communication line for each hierarchy level. Therefore, there is a problem that the communication line becomes complex when the communication network is constructed by the device management system in Patent literature 1 with the wired communication line.

Furthermore, there is a possibility that disconnection point between the different hierarchy levels may be occurred. In this case, the prior device management system is not capable of operating the communication network located under the disconnection point as an independent system. Furthermore, the prior device management system is not capable of establishing the connection between the communication network located in the high hierarchy level and the communication network located in the low hierarchy level with passing through the communication network between the communication network located in the high hierarchy level and the communication network located in the low hierarchy level.

In addition, there may be a case that the device management system having local management units which are configured to transmit an existence acknowledgement packets at an appropriate timing under the BACnet protocol so that the local management unit checks the communication which is established or unestablished. When the existence acknowledgement packet transmitted from one of the local management unit, the other local management units also receives the existence acknowledgement packet. Such transmissions and receptions of the packet cause increase of traffic of the communication network in the high communication network.

This invention is achieved to solve the above problem. An object of this invention is to provide a device management system which has high system extensibility and high system flexibility.

To solve the above problem, this invention discloses a device management system. This device management system is provided for monitoring and/or controlling a plurality of devices through a communication network. The device management system comprises a plurality of terminal units and a plurality of nodes. A plurality of the terminal units are connected respectively to the devices. A plurality of the nodes is cooperative with the terminal units to construct the communication network which has a logically hierarchized structure. The nodes include a superior node, an internal node, and an inferior node. The internal node is connected to the superior node such that the internal node is located in a lower hierarchy level than the superior node. The inferior node is connected to the internal node such that the inferior node is located in a lower hierarchy level than the internal node. Each nodes has an upper communication unit, a lower communication unit, and a memory. The upper communication unit is configured to communicate with the node in a high hierarchy level. The lower communication unit is configured to communicate with the node in a low hierarchy level. The memory holds management information which is utilized for controlling and/or monitoring the devices. The upper communication units of the nodes respectively have upper management units. Each one of the upper management unit is configured to transmit the management information to the nodes in the high hierarchy level. The lower communication units of the nodes respectively have lower management communication units. Each one of the lower management communication unit is configured to transmit the management information to the nodes in the low hierarchy level. With this configuration it is possible to construct the hierarchized structure by providing the communication path between the upper communication unit and the lower communication unit. Therefore, the hierarcized structure is easily constructed by setting the relationship between the nodes arbitrary. In addition, it is possible to easily expand the system.

It is preferred that each one of the superior node, the internal node, and the inferior node has a usage communication unit. The usage communication unit is connected to an operation and display device. The operation and display device is configured to display contents stored in the memory. The operation and display device is configured to set the contents stored in the memory. In this case, the contents in the memory of the nodes are visualized by the operation and display device which is connected to the nodes through the usage communication unit. In addition, there is a situation where the system in the low hierarchy level is disconnected to the system in the high hierarchy level when the system in the low hierarchy level is operated. However, this configuration makes it possible for the operation and display device to manages the system in the low hierarchy level even if the system in the low hierarchy level is disconnected to the system in the high hierarchy level.

It is preferred that the upper communication unit further includes an upper setting communication unit. The upper setting communication unit receives information which is stored in the memory from the communication network in the high hierarchy level. The lower communication unit further includes a lower setting communication unit. The lower setting communication unit is configured to transmit the at least a portion of the information (received by the upper setting communication unit) to the communication network in the low hierarchy level. This configuration makes it possible to set the information stored in the memory through the communication network having a logically hierarchized structure. Therefore, when the nodes in the high hierarchy level transmit the information, the nodes in the low hierarchy level are set in accordance with the information. Therefore, this configuration makes it possible to save the electrical power when the nodes are set on the basis of the information.

It is preferred that both the upper management communication unit and the lower management communication unit are configured to use a first communication protocol. The usage communication unit is configured to use a second communication protocol. The upper setting communication unit and the lower setting communication unit are configured to use a third communication protocol. At least one of the first communication protocol, the second communication protocol, and the third communication protocol is same to a protocol which is used in each the nodes. With this configuration, it is possible to share a signal line for transmission of the management information and modification information of the setting information. In addition, it is also possible to simplify the management of the system by sharing the communication protocol.

It is preferred that the nodes respectively include signal processors having a CPU. All the signal processors are configured to run the same program. In this case, it is possible to divert the node in the one of the hierarchy level to the other hierarchy level by replacing the program. Therefore, when the abnormality is caused to a specify node, it is possible to prevent the failure of the system by replacing the nodes which is used in the other nodes. That is, it is possible to construct the system hard to cause the failure of the system.

It is preferred that the internal node is configured to pass the information through the internal node and store no information to the memory of the internal node when the internal node receives a packet including a command indicative of passing the information through the internal node. In this case, there is no need to store the information in all the memories of the nodes which transmits the information. That is, the information passes through route nodes which are defined by the nodes between a source node and a destination node. Therefore, it is possible to construct a large scale system when hardware resources of the nodes are limited. That is, in the system having a tree-shaped structure, memory of the route nodes requires a large size of the memory when the memory of the route nodes store the information which passes through the route nodes. However, with this configuration, it is possible to use the nodes having little hardware resource as the route nodes. Therefore, it is possible to monitor and/or control the system by embedded devices having a limited hardware resource.

It is preferred that each the node is configured to transmit the information to the communication network in the high hierarchy level through the upper communication unit only when the lower communication unit of the nodes receives the packet having a predetermined command from the nodes in the low hierarchy level. In this case, only the packet having a predetermined command is transmitted from the nodes in the low hierarchy level to the high hierarchy level. Accordingly, it is possible to reduce usage of the hardware resource.

It is preferred that the devices are disposed in a predetermined management area which is divided into sub-area. Each sub area is provided with a local management unit and an area unit. The local management unit is defined by the terminal unit. The local management unit establishes the communication network of the low hierarchy level. The area unit is defined by the node. The area unit is configured to communicate with the local management unit in order to collect information of the sub-area. The device management system further includes an area separating device. The area separating device is interposed between the area unit in each the sub area and the communication network of the hierarchy provided with an upper management unit. The local management unit is configured to transmit and receive a communication packet therebetween. The area separating device is configured to avoid the communication packet from leaking into the communication network in the high hierarchy level. The area unit is configured to communicate with the upper management unit through the area separating unit. In this case, it is possible to reduce the traffic in the communication network in the high hierarchy level. Therefore, this configuration makes it possible to expand the system having a limited communication capacity. In addition, the local management unit is disposed in each the sub areas. The local management unit constructs the communication network of the low hierarchy level. The local management unit is configured to manage the communication network of the low hierarchy level, and is configured to collect the information of the sub area. Therefore, it is possible to expand the system of each the area by disposing the local management unit arbitrary. Therefore, this configuration makes it possible to modify the system flexibly.

It is preferred that the upper management device is configured to send a bulk control instruction of simultaneously controlling a plurality of the devices in each the sub area. Upon receiving the bulk control instruction, the area unit is configured to designate one of the local management units. One of the local management units manages the devices. In addition, the area unit is configured to send the bulk control instruction to thus designated local management unit. Upon receiving the bulk control instruction, the local management unit is configured to designate the device and provide an instruction to thus designated devices for controlling the same in accordance with the bulk control instruction. In this case, when the upper management unit controls the devices simultaneously, it is only required to manage the local management unit managing the designated devices. In addition, the local management unit is required to manage the devices which are managed by the local management unit. Therefore, it is possible to manage the devices controlled according to the bulk control instruction hierarchically. As a result, it is possible for the area unit and the local management unit to manage a small amount of the devicees.

It is preferred that the nodes are configured to determine a timing for controlling the devices and are configured to control the devices on the timing when the nodes controls the devices under the management of the local management device in the sub area. In this case, it is possible to control the devices according to the timing.

In addition, this invention also provides a communication network device. The communication network device is used by a device management system for monitoring and/or controlling a plurality of devices by a communication network having a high hierarchy level, a medium hierarchy level, and a low hierarchy level. The communication network device is used in the medium hierarchy level. The communication network device comprises an upper communication unit, a lower communication unit, and a memory. The upper communication unit is configured to communicate with the communication network device in the high hierarchy level. The lower communication unit is configured to communicate with the communication network device in the low hierarchy level. The memory stores management information for monitoring and/or controlling the devices. The upper communication includes an upper management communication unit. The upper management communication unit is configured to communicate with the communication network in the high hierarchy level. The lower communication unit includes a lower management communication unit. The lower management communication unit is configured to communicate with the communication network in the low hierarchy level. In this case, it is possible to obtain the communication network having the hierarchized structure by connecting the communication network device through the upper communication unit and the lower communication unit. That is, the system is easily constructed by connecting the communication network device arbitrary.

It is preferred that the communication network device further comprises a usage communication unit. The usage communication unit is connected to an operation and display device. The operation and display device is configured to show contents in the memory. The operation and display device is configured to set the contents stored in the memory. In this case, the contents in the memory are displayed by the operation and display device connected to the usage communication unit of the communication network device. In addition, the contents in the memory are set by the operation and display device connected to the usage communication unit of the communication network device.

It is preferred that the communication network device is configured to pass the information and store no information to the memory when the communication network device receives a packet including a command indicative of passing of the information. A route communication network device between a source communication network device and a destination communication network device passes the information therethrough. That is, There is no need to hold the information by the route communication network device. As a result, it is possible to monitor and control the system by the communication network device having a limited hardware resource.

It is preferred that the communication network device is configured to send the information to the communication network in the high hierarchy level through the upper communication unit only when each the communication unit of the communication network device receives a packet having a predetermined command from the communication network device in the low hierarchy level. In this case, only the packet having a predetermined command is transmitted from the communication network device in the low hierarchy level to the high hierarchy level. Accordingly, it is possible to reduce usage of the hardware resource.

BRIEF EXPLANATION OF THE DRAWINGS

FIG. 4 (a) shows a control definition table which in the first and the second embodiments.

FIG. 4 (b) shows a control definition table which in the first and the second embodiments.

FIG. 11 shows a format of the communication packet of the third embodiment.

BEST MODE FOR CARRYING OUT THE INVENTION

First Embodiment

In this invention, management of the devices is defined as monitoring operation condition of the devices and controlling the operation condition of the devices. In this invention areas each are provided with the devices which is managed by the system are defined as a management area. The management area is divided into a plurality of sub-areas. The management area is exemplified by a place in buildings such as an office building, a multidwelling, a hospital, a school, a gymnasium, a museum, and a shopping center. The management area is also exemplified by premises of the multidwelling, regions including a plurality of buildings, developed residential zones including a plurality of dwelling units, and parks. The management area is provided with the devices such as the lighting devices and air conditioning equipments. The sub-area corresponds to floors or rooms of the building, and partitioned areas of zone. It is also possible employ the hierarchized structure such that the management area includes a plurality of the zones each of which has a plurality of sub area.

Figure 2:
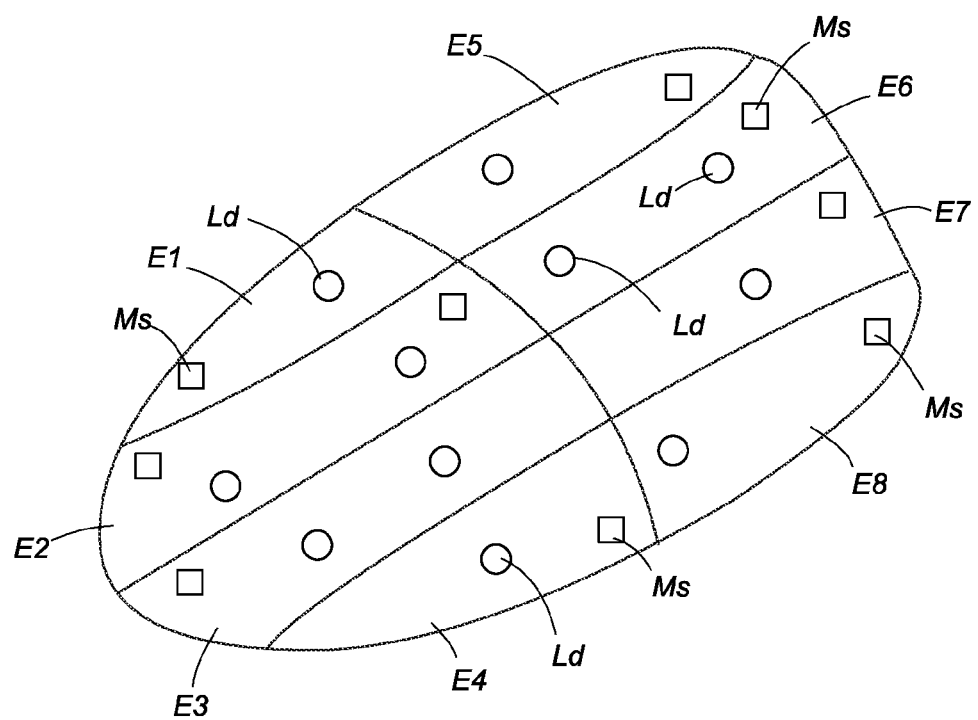
FIG. 2 shows a relationship between a management area and sub areas in the first and second embodiments.

Hereinafter, as shown in FIG. 2, the park is envisioned as the management area A. The management area A includes a plurality of sub-areas E1 to E8 which are different from each other. When there is no necessarily of expressing one of the sub-areas E1 to E8 from the other sub-areas, the sub-areas are referred to as "E".

Figure 1:
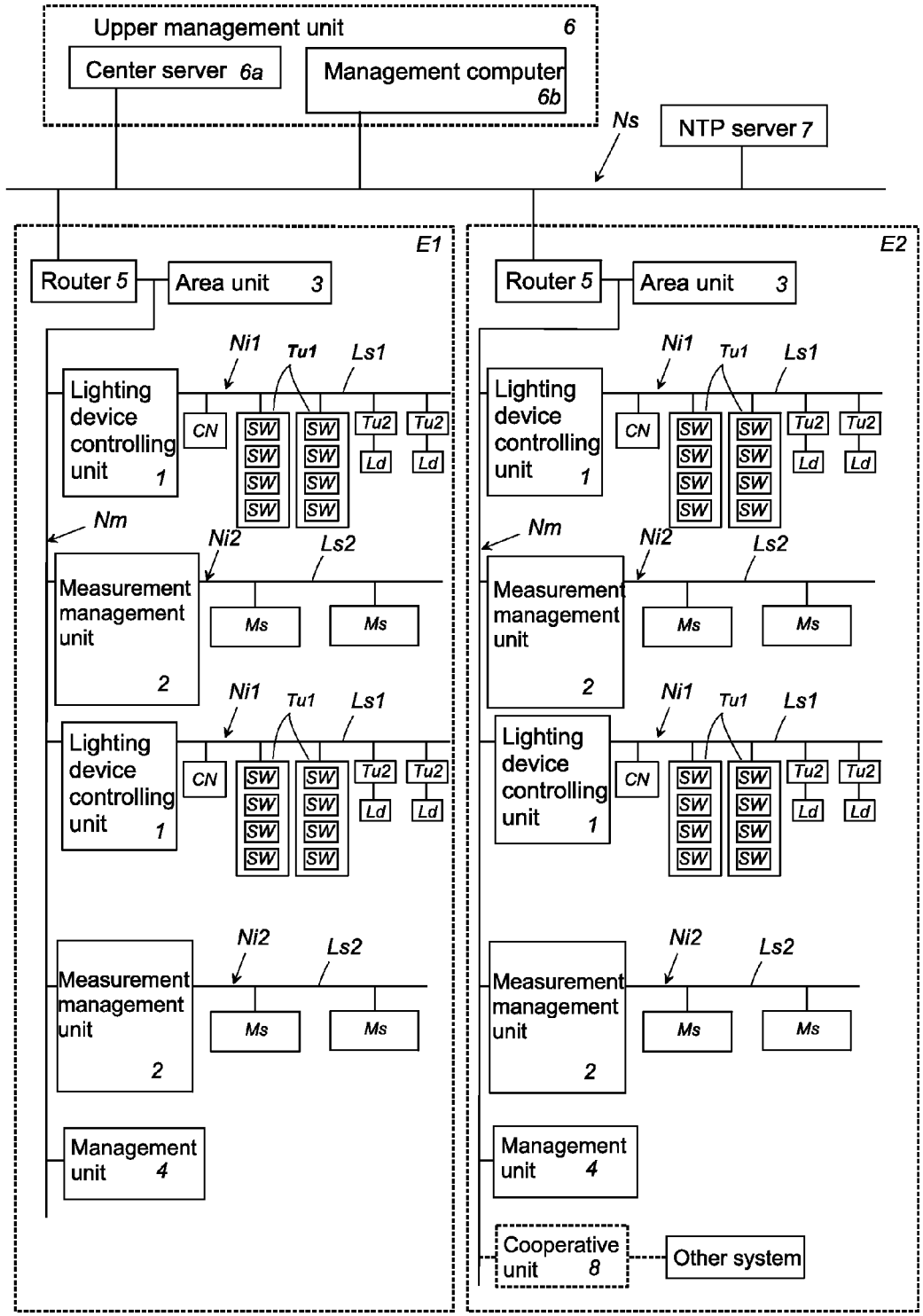
FIG. 1 shows a block diagram of a first embodiment and a second embodiment.

In this embodiment, the devices which are monitored and/or controlled by the device management system are exemplified by the lighting devices. Similarly, the devices which are monitored by the device management system are exemplified by the measurement devices being configured to measure an amount of voltage, electrical current and electrical power FIG. 1 shows a communication network for management of the devices. The illustrated communication network has a logically hierarchized structure such that the illustrate communication network has three hierarchy levels. The communication network in the medium layer is defined as a medium network Nm. The communication network in the low hierarchy level is defined as a low networks Ni1 and Ni2. A local management unit is provided between the medium communication network and the low communication network. The local management units are such as lighting device controlling units 1 and a measurement management unit 2. The lighting device controlling units 1 and the measurement management units 2 are defined as lower nodes. The high communication network is defined as a high network Ns. A router is disposed between the high network Ns and the medium network Nm. Each the low network Ni1 and Ni2 groups a same kind of the devices. In this embodiment, the low networks Ni1 groups the devices for monitoring and controlling. The low networks N2 groups the devices for monitoring.

Furthermore, the medium network Nm is connected to an area unit 3 and a management unit 4. Each sub-area E includes one area unit 3 and one management unit 4.

The high network Ns is connected to a center server 6a and a management computer 6b. The center server 6a is cooperative with the management computer 6b to act as an upper management unit 6. The upper management unit 6 corresponds to an superior node 6, and also corresponds to a global management unit. The high network Ns acts as the local area network. However, the high network Ns is connected to NTP server 7 (Network Time Protocol server 7).

On the other hand, the low network Ni1 has a two wire signal line Ls1. The low network Ni1 constructs a communication network implementing a time-division multiplex transmission which uses a transmission signal having a fixed length. The low network Ni2 constructs a communication network implementing a serial communication such as RS-485 and RS-232C for transmitting and receiving information. It is also possible to employ the low network Ni2 which construct a communication network of Ethernet (registered trademark) for transmitting and receiving the information.

The low network Ni1 has a transmission device CN, operation terminal units TU1, and control terminal units TU2. The transmission device CN is configured to transmit the transmission signal having the fixed-length to the signal line Ls1 periodically. Both the operation terminal units TU1 and the control terminal units TU2 are connected to the signal line Ls1. Each the operation terminal units TU1 are provided with switches SW. Each the control terminal units TU2 are provided with the lighting device Ld. Each the control terminal unit TU2 has an address which corresponds to the lighting device and the switch SW. The transmission device CN includes a relation table for relating the addresses of the switches SW to the addresses of the lighting devices. Therefore, the lighting device Ld is turned on and turned off according to the operation of the switches SW corresponding to the lighting device Ld. It is possible to employ a light detector and a human detector instead of the switches SW. With this configuration, the lighting devices are turned on and turned off according to the detection of the light by the light detector and the detection of human existence by the human detector.

Operation of the low network Ni1 is briefly-explained as follows. The transmission device CN transmits the transmission signal having the fixed length periodically. When the switch SW is operated, the low network Ni1 transmits an interrupt signal to the signal line Ls1 at a timing being synchronized with the transmission signal. The interrupt signal is received by the transmission device CN. When the transmission device CN receives the interruption signal, the transmission device CN sends a transmission signal indicative of requirement of the address.

The transmission signal is provided with a time slot for carrying the information sent from the operation terminal unit TU1. When the transmission device CN sends the transmission signal indicative of the requirement of the address, the operation terminal unit TU1 produces the interrupt signal. Subsequently, the operation terminal unit TU1 sends self address to the transmission device within the time slot. According to the transmission signal indicative of the address from the operation terminal unit TU1, the transmission device CN recognizes the condition where the lighting device is on state or off state. The transmission device CN refers the relation table in order to obtain the address of the switch SW corresponding to the lighting device Ld. Furthermore, the transmission device CN designates the address of the lighting device and sends the transmission signal to the lighting device Ld which corresponds to the switch SW. Consequently, the transmission device CN turns on and turns off the lighting device on the basis of the condition sent from the operation terminal unit TU1.

The transmission signal is a bipolar signal having a positive signal state and a negative signal state. The negative signal state has voltage value which is symmetrical with respect to the positive signal state. The transmission signal is pulse width modulated such as to have digital value. Each one of the operation terminal unit TU1 and the control terminal unit TU2 is configured to rectify the transmission signal in order to obtain the electric power in order to communicate with the transmission device. The number of the lighting device Ld connected to the low network Ni1 is limited. For example, the number of the switches SW connected to the low network Ni1 is limited equal to or less than 256.

The lighting device controlling units 1 are connected to the signal line Ls1. Therefore, it is possible to obtain the operation condition of the lighting devices Ld by monitoring the transmission signal. In addition, because the lighting device controlling units 1 are connected to the signal line Ls1, it is possible to operate the lighting devices as well as the operation terminal units TU1. Therefore, it is possible to turn on and turn off the lighting device as well as the switches SW.

The low network Ni1 relates the address of the operation terminal unit TU1 to the address of the control terminal unit TU2 in order to relate the switch SW to the lighting device Ld. With this configuration, the each the switches are related to each the lighting device on one-on-one level. Furthermore, this configuration also makes it possible to relate one switch to a plurality of the lighting devices. Therefore, this configuration makes it possible to perform an individual processing, a group processing, and a pattern processing. The low network Ni1 in the individual processing is configured to turn on or turn off one lighting device by turning on or turning off one switch SW. The low network Ni1 in the group processing is configured to simultaneously turn on or turn off the lighting devices. The low network Ni1 in the pattern processing is configured to turn on predetermined lighting devices in a first group and turn off predetermined lighting devices in a second group. It is noted that the group processing and the pattern processing is collectively referred to as a bulk control instruction.

When the group processing is performed, a plurality of the lighting devices related to the switch SW has same condition of on state or off state. In the group processing, a plurality of the lighting device related to the switch SW is interlocked with each other according to switching of the switch SW. On the other hand, in the pattern processing, each lighting device is set to on state or off state individually. Therefore, when the switch SW is operated, conditions (on state or off state) of the lighting devices Ld is designated.

The measurement management unit 2 is connected to the signal line Ls2. The measurement management unit 2 is connected to the measurement devices Ms of the low network Ni2. The measurement management unit 2 is configured to communicate with the measurement devices Ms via a serial communication method. Consequently, the measurement management unit 2 sends indication to the measurement devices Ms, and receives the information from the measurement devices Ms. The measurement device Ms is configured to measure instantaneous value of the voltage, the electrical current, and the electrical power. In addition, the measurement device Ms is configured to measure integration value of the voltage, the electrical current, and the electrical power. Therefore, the measurement management unit 2 is configured to monitor the operation of the lighting devices Ld on the basis of measurement information sent from the measurement devices Ms.

The high network Ns uses an IP protocol corresponding to IPv6 at the network layer. The high network Ns uses a private protocol for a protocol of the high hierarchy level. The middle network Nm uses the IP protocol at the network layer. The middle network Nm uses the BACnet protocol for the high hierarchy level. The BACnet protocol acts as a standard open protocol for devices. Therefore, the area unit 3 is configured to communicate with the lighting device controlling unit 1 in order to obtain the operation condition of the lighting device Ld. The area unit 3 is configured to communicate with the lighting device controlling unit 1 in order to operate the lighting device. In addition, the area unit 3 is configured to communicate with the measurement management unit 2 in order to obtain the measurement information measured by the measurement device Ms.

The management unit 4 is configured to store information of the types of the devices including the lighting devices Ld and the measurement devices Ms of the low networks Ni1, Ni2, and the middle network Nm managed by the area unit 3. The management unit 4 is configured to store the addresses of the devices including the lighting devices Ld and the measurement devices 20 of the low networks Ni1, Ni2, and the middle network Nm managed by the area unit 3. In addition, the management unit 4 is configured to store setting data for setting conditions of the lighting device controlling units the measurement management units 2, and the area units 3. Furthermore, the management unit 4 is configured to check the units in the area E on the basis of reply signal which is generated when the middle network Nm receives the existence acknowledgement packet. The management unit 4 is configured to generate alarm when the management unit 4 recognizes the device is inactive. In this case, if needed, the management unit 4 gives alarm information to the upper management unit through the area unit 3 such that a display device of the upper management unit 6 displays alarm indicative of the inactive condition of the devices. Furthermore, when the area unit 3 is inactive, the management unit 4 is configured to give the alarm information to the upper management unit 6 directly.

Hereinafter, each the units (the lighting device controlling units 1, the measurement management units 2, the area unit 3, and the management unit 4 which act as the end terminal of the middle network Nm) are particularly explained.

The lighting device controlling units 1 has a hardware construction which is same as hardware constructions of the measurement management unit 2, the area unit 3, and the management unit 4. On the other hand, each one of the lighting device controlling unit 1, the measurement management unit 2, the area unit 3, and the management unit 4 has a software construction which is different in a software construction from the other. Therefore, the hardware construction of the area unit 3 is explained as a representative of the lighting device controlling unit 1, the measurement management unit 2, the area unit 3, and the management unit 4.

Figure 3:
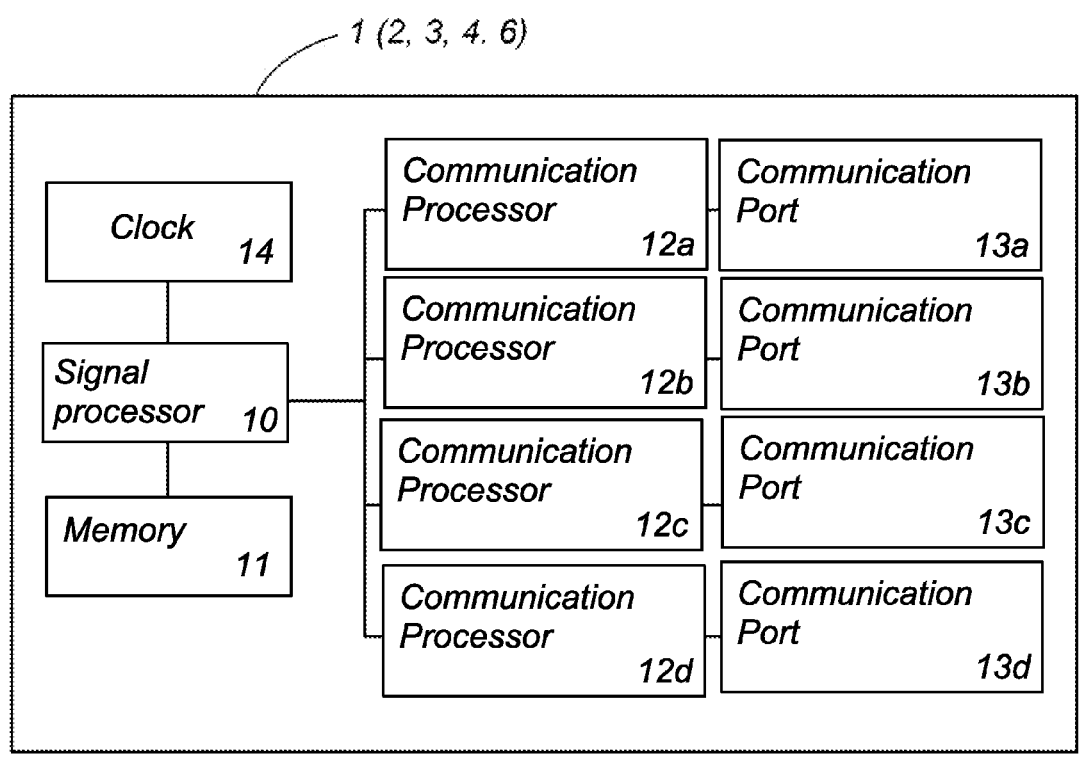
FIG. 3 shows a block diagram indicating the construction of the units employed in the first and the second embodiments.

FIG. 3 shows the area unit 3. The area unit 3 includes a microcomputer having a signal processor 10, a memory 11, a plurality of communication processors 12a to 12d, a plurality of communication ports 13a to 13d, and a clock 14. The signal processor 10 is constructed by a CPU. The memory 11 includes a RAM and a ROM. The ROM is exemplified by a detachable flash ROM. As shown in FIG. 3, the area unit 3 has four communication processor and four communication port. The communication processors correspond to a plurality of communications respectively. The communication processors are connected to telegraph wires respectively through the communication ports 13a to 13d. The clock 14 is configured to recognize time. In addition, the area unit 3 is also provided with DIP switches and light emitting diodes for optically informing the operation condition.

Both the communication processor 12a and the communication port 13a meet Ethernet (registered trademark) standard. Both the communication processor 12b and the communication port 13b are provided for serial communication. Both the communication processor 12b and the communication port 13b meet standard such as RS-485 standard and RS-232C standard. Both the communication processor 12c and the communication port 13c are connected to a device constructing a central control network. Both the communication processor 12d and the communication port 13d are connected to a device constructing a distributed control network.

In the system shown in FIG. 1, the communication port 13a is connected to the middle network Nm. The connection port 13b is connected to the low network N12 which is connected to the measurement devices Ms. One of the communication port 13c and the communication port 13d is connected to the low network Ni1 which is connected to the lighting devices Ld. One of the communication port 13c and the communication port 13d is utilized according to the low network Ni1 which acts as the central control network or the distributed control network.

The communication processors 12a to 12d are configured to generate the communication packet which is sent from the communication ports 13a to 13d, respectively. The communication processors 12a to 12d are configured to extract the data from the communication packet which is received by the communication ports 13a to 13d, respectively. The communication ports 13a to 13d are formed to have a shape connectable with respect to communication wires adapted for the middle network Nm.

The memory 11 is configured to store a plurality of a system program and a data. The system program stored in the memory 11 includes an instruction of the operation of the signal processor 10. The data stored in the memory 11 includes an instruction of the operation required for the area unit 3 when the area unit 3 operates. The data stored in the memory 11 is composed of a network transmission setting data and a device management setting data. The network transmission setting data is required for the communication using the communication processors 12a to 12d and the communication ports 13a to 13d. The device management setting data is used for the management of the devices such as the lighting devices Ld and the measurement devices Ms. The clock 14 is configured to send the time information when the clock 14 receives time requirement signal. The time of the clock is synchronized with a time of the NTP server 7 by a timer synchronization function of the signal processor 10.

The signal processor 10 is configured to be operated on the basis of the program stored in the memory 11. The area unit 3 is not connected to the low networks Ni1 and Ni2 each of which is connected to the lighting device controlling units 1 and the measurement management units 2. However, each the lighting device controlling unit 1 and the measurement management unit 2 has the signal processor 10 which is configured to monitor and control the lighting devices Ld and the measurement devices Ms through the communication processor 12a, 12b and the communication port 13a, 13b. On the other hand, the signal processor 10 of the area unit 3 has a monitoring and controlling function for transmission and reception of device management information with respect to the lighting device controlling units 1 and the measurement management unit 2. The device management information is used for managing the devices such as the lighting devices Ld and the measurement devices Ms. Furthermore, the signal processor 10 has a web service function. The web service function is provided for display of the information obtained from the lighting device controlling units 1 and the measurement management units 2 on the upper management unit 6 connected to the high network Ns. That is, the information obtained by the area unit 3 from the lighting device controlling units 1 and the measurement management units 2 is visualized by the upper management device 6. The area unit 3 has a timer adjusting function for adjusting the time of the clock 14 by communication of the NTP server 7. These functions are functioned when the signal processor 10 is operated according to the program stored in the memory 11.

The network transmission setting data includes a source IP address, a destination IP address, and a broadcast address in the sub areas E. The source IP address is indicative of a source in the communication. The destination IP address is indicative of a destination in the communication. Moreover, the network transmission setting data includes a correspondence table which is indicative of the relationship between the IP addresses of the lighting device controlling units 1, the measurement management units 2 and the management numbers of the lighting device controlling units 1, the measurement management units 2.

The management numbers corresponding to the IP addresses are respectively represented by character strings such as "lighting device—1", lighting device—2", and "measurement management—1". That is, the management numbers are obtained by combination of a first string for distinguishing between the lighting device controlling unit 1 or the measurement management unit 2 and a second string for the number. Because the area unit 3 has the correspondence table, the area unit 3 uses the management number instead of the IP address in order to communicate with the lighting device controlling unit 1 and the measurement management unit 2.

The device management setting data includes two data of a maximum number and an actual number. The maximum number indicates the number of connectable units such as the lighting device controlling units 1, the measurement management units 2, the area unit 3, and the management units 4 with in the sub-area E having the area unit 3. The actual number indicates the number of actually connected units such as the lighting device controlling units 1, the measurement management units 2, the area unit 3, and the management units 4 with in the sub-area E having the area unit 3. A value of the device management setting data is used for monitoring the lighting device controlling units 1 and the measurement management units 2. The device management setting data further includes a control definition table. The control definition table is used for controlling the lighting device controlling units 1 and the measurement management units 2.

The control definition table is used for performing the group processing or the pattern processing in order to control the lighting device controlling units 1 and the measurement management units 2. The control definition table for the group processing is equal to the control definition table for the pattern processing. Therefore, the control definition of the group processing is explained as follows.

The control definition table includes a data structure shown in FIG. 4 (a). The control definition table includes global group names. Each global group name has combinations of management numbers and local group names. The management numbers is exemplified by "lighting device—1" and "lighting device—2". The management numbers is used for identifying the lighting device controlling units 1 connected to the lighting devices Ld which are simultaneously controlled according to the bulk control instruction. The local group names are exemplified by "g1" to "g4". The local group names indicate the lighting devices Ld belonging to the local groups, respectively. Therefore, when each the global group names G1 and G2 is selected, it is possible to control the bulk control instruction a group of the lighting devices Ld identified as g1 to g4 which are connected to each the lighting device controlling units 1.

The transmission device CN, connected to the lighting device controlling units 1, includes a relation table shown in FIG. 4 (b). The relation table includes a relationship between the local group names g1 to g4 and the addresses 1 to 16 of the lighting devices Ld which is controlled according to the bulk control instruction. That is, the local group names g1 to g4 are given to the addresses 1 to 16 of the lighting devices which will be performed by the bulk control instruction when the group processing is performed.

In this case, because the group processing is performed, the group processing is performed with respect to the group of one of the local group names g1 to g4. Furthermore, a plurality of the group processing is simultaneously performed when the global group name G1 or G2 is selected. This control is defines as a global group processing. Moreover, it is possible to perform the pattern processing instead of the group processing. In addition, it is also possible to simultaneously perform a plurality of the pattern processing by using a global pattern name instead of the global group names G1 and G2. This control is defined as a global pattern processing.

When the area unit 3 receives the indication of turning on the lighting devices Ld belonging to the global group name G1 from the upper management unit 6, a following operation is performed. The area unit 3 develops the control definition table in FIG. 4 (a) in order to extract the global group name G1. The global group name G1 is related to "lighting device—1" and "lighting device—2". Therefore, the area unit 3 sends the indication of turning on the lighting devices Ld which belong to the local group names g1 and g3 to the lighting device controlling unit 1 having the management number of "lighting device—1" and the lighting device—2" through the middle network Nm.

The lighting device controlling unit 1 having the management numbers of "lighting device—1" and "lighting device—2" sends the local pattern names g1 and g3 to the transmission device CN each of which is connected to the low network Ni1. Therefore, the each transmission device CN checks the local group names g1 and g3 against the relation table. Consequently, the transmission device CN obtains the addresses of the lighting devices Ld which are simultaneously turned on. The transmission device CN sends the transmission signal to the control terminal units TU2 connected to the lighting devices Ld. In this manner, group processing of the lighting devices are performed.

In particularly, the transmission device CN is connected to the lighting device controlling units 1 having the management number indicating "lighting device—1" and "lighting device—2". Therefore, in a case where the transmission device CN includes the relation table shown in FIG. 4 (*b*), the lighting devices Ld having the addresses 1 to 4 is operated in the low network Ni1 connected to the lighting device controlling unit 1 having the management number indicating the "lighting device—1". In addition, the lighting devices Ld having the addresses 9 to 12 is operated in the low network Ni1 connected to the lighting device controlling unit 1 having the management number indicating the "lighting device—2". This operation is explained on the basis of the group processing. Therefore, in this operation, the lighting devices Ld are simultaneously turned off or turned on. It is noted that it is possible to employ transmission devices different in a relation table from each other.

That is, it is possible to operate a plurality of the lighting devices Ld in the sub area E simultaneously by using the global group name G1. It is possible for the upper management unit 6 to generate control information including a command of turning on or off the lighting devices Ld. In addition, it is possible for the upper management unit 6 to send the control information to the area unit 3 in a plurality of sub areas E while specifying the global group names. With this configuration, the area unit 3 in each the areas E develops the global group name in order to obtain a combination of the management number of the lighting device controlling unit 1 and the local group name. Finally, the group processing in the low network Ni1 by using the local group name is performed.

That is, the upper management unit 6 sends the global group name to the area unit 3 of each the area E. Therefore, the upper management unit 6 sends simple information of global group name to the area unit 3 of each the sub area E. Therefore, even if a system including a huge number of the lighting devices Ld are constructed, it is possible to prevent the traffic from increasing in the high network Ns. Furthermore, in the sub area E, it is required to send the combination of the management number and the local group name developed from the global group name to each the lighting device controlling units 1. Therefore, it is also possible to prevent the traffic from increasing in the middle network Nm. In addition, a normal group processing is performed in the low network Ni1. Therefore, operation in the low network Ni1 is similar to operation independently. Therefore, it is possible to operate the device management system similar to a prior load controlling system without concerning the operations of the high network Ns and the middle network Nm.

Figure 5:
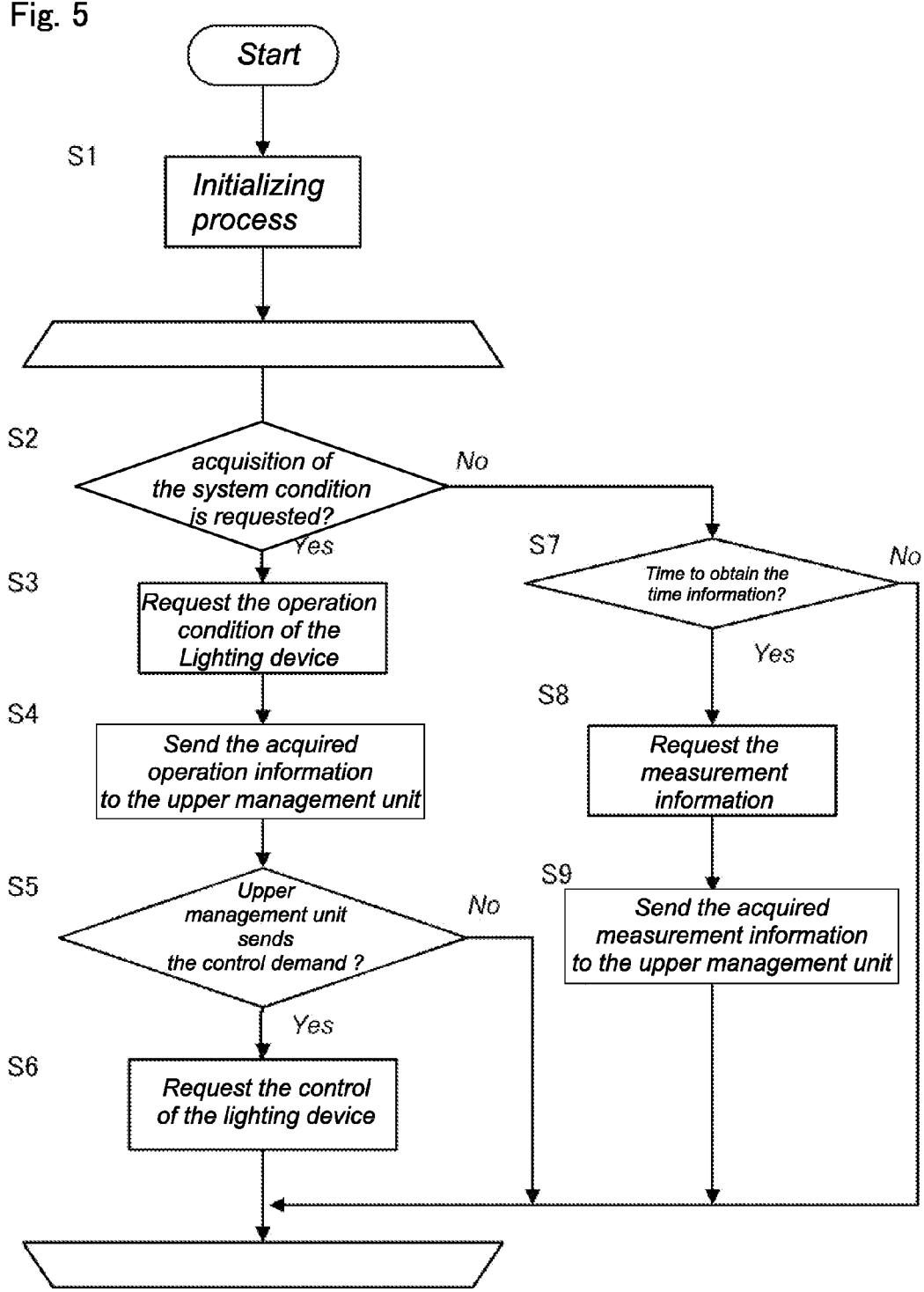
FIG. 5 shows a flow diagram of operation of the area unit employed in the first and the second embodiments.

As shown in FIG. 5, when the area unit 3 is started, the area unit 3 performs the initializing process (S1). Thereafter, the area unit 3 sends the existence acknowledgement packet in order to receive the response from the lighting device controlling units 1 and/or the measurement management units 2.

That is, the area unit 3 sends the existence acknowledgement packet in order to obtain a system condition. Subsequently, when the area unit 3 performs the step (S2: lighting) of receiving the system condition from the lighting device controlling unit 1, the area unit 3 performs the step (S3) of requesting the operation condition of the lighting device Ld which is managed by the lighting device controlling unit 1. Consequently, the area unit 3 obtains the operation condition of the lighting devices Ld. Furthermore, the area unit 3 performs the step S4 of sending the obtained operation condition to the to the upper management unit 6. Subsequently, when the area unit 3 perform the step (S5: Yes) of receiving a control demand for controlling the lighting device Ld from the upper management unit 6, the area unit 3 performs the step S6 of requesting a control of the lighting device Ld to the lighting device controlling units 1. On the other hand, the area unit 3 performs the step (S5: No) of receiving no control demand from the upper management unit 6, the area unit 3 performs the step 2 again.

In the step 2, when the area unit 3 performs the step (S2: Measurement) of obtaining the system condition from the measurement management unit 2, the area unit 3 judges the time to obtain the measurement information from the measurement device Ms under the management of the measurement management unit 2. This time is previously determined at specified time interval of such as 30 minutes. When the time is equal to the time for obtaining the measurement information (S7: Yes), the area unit 2 requests the measurement information from the measurement management unit 2, thereby obtaining the measurement information (S8). Subsequently, the area unit 3 sends the measurement information to the upper management unit 6 (S9). In contrast, when the time is not equal to the time for obtaining the measurement information (S7: No), the area unit 2 performs the step S2 again.

It is noted that the area unit 3 is configured to repeat the step between a trapezoid and an inverted trapezoid shown in FIG. 5. Therefore, the area unit 3 is configured to repeat the steps S2 to S9. In addition, it is preferred that the area unit 3 is configured to send the information to the upper management unit 6 and the management unit 4 at the same time. In this case, it is possible to send the information from the area unit 3 through the management unit 4 to the upper management unit 6 instead of sending the information from the area unit 3 directly to the upper management unit 6.

In addition, when the area unit 3 receives no reply from the lighting device controlling units 1 or the measurement management units 2 with respect to the transmission of the existence acknowledgement packet from the area unit 3, the area unit 3 recognizes that abnormalities of the lighting device controlling units 1 or the measurement management units 2. Thereafter, the area unit 3 gives the abnormalities of the lighting device controlling units 1 or the measurement management units 2 to the upper management unit 6.

Figure 6:
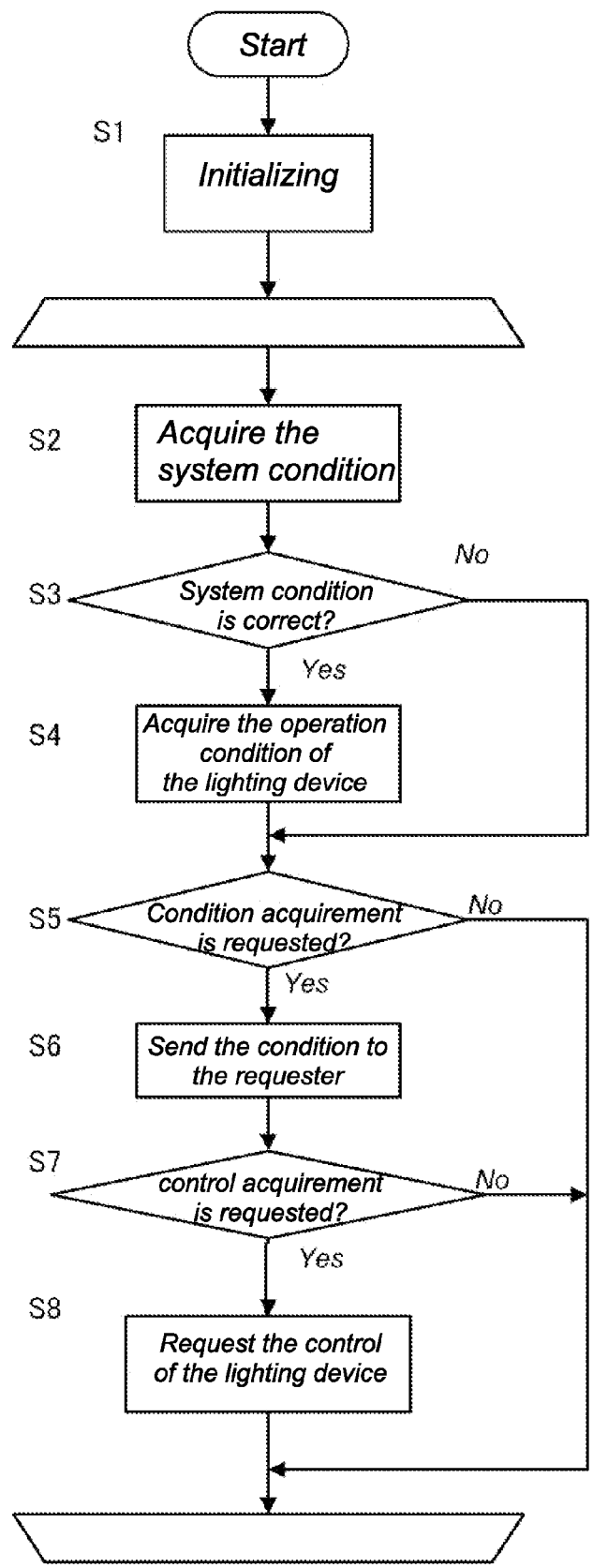
FIG. 6 shows a flow diagram of operation of a lighting device controlling unit of the first and the second embodiments.

FIG. 6 shows operation of the lighting device controlling unit 1. When the lighting device controlling unit is started, the lighting device controlling unit 1 performs an initializing process (S1). Subsequently, the lighting device controlling unit 1 requests the system condition from the transmission device CN being located in the low network Ni1 (S2). This system condition includes open-close information, duplication address information, and so on. In particular, the open-close information is indicative of open or short of the signal line Ls1. The duplication address is indicative of existence or nonexistence of an incorrect setting of the operation terminal unit TU1 and the control terminal unit TU2. When the system condition is normal (S3), the lighting device controlling unit 1 obtains the operation condition indicative of turning on or turning off the lighting devices Ld (S4).

When the lighting device controlling unit 1 receives the acquisition demand of sending the condition indicative of the on state or the off state of the lighting device Ld and the system condition from the middle network Nm (S5: Yes), the lighting device controlling unit 1 transmits the system condition and the on state or off state to a target unit that the acquisition demand sends. (Ordinary, the target unit is equal to the area unit 3. However, as mentioned later, there is a possibility that the target unit is equal to the area unit 3.) When the lighting device controlling unit 1 detect the abnormality of the system condition (S3: No), the lighting device controlling unit 1 sends the abnormality to the target unit.

In step S4, it is possible to employ the lighting device controlling unit being configured to obtain the condition indicative of the on state or the off state of the lighting devices Ld from the transmission device CN, being configured to send no reply with respect to the demand when there is no variation between the condition obtained at the last time and the condition obtained at this time. That is, the lighting device controlling unit is configured to send the reply with respect to the demand when there is a variation between the condition obtained at the last time and the condition obtained at this time. With this configuration, the traffic in the low network Ni1 is reduced. In addition, it is also possible to reduce the traffic in the middle network Nm by transmission of only the information indicative of the variation of the condition of the lighting device Ld.

On the other hand, when the lighting device controlling unit receives no acquisition demand from the middle network Nm (S5: No), the lighting device controlling unit judges existence or nonexistence of the control demand of the lighting device Ld through the middle network Nm. When the lighting device controlling unit recognizes the existence of the control demand of the lighting device Ld (S7: Yes), the lighting device controlling unit operates the lighting devices according to the control demand. On the other hand, when the lighting device controlling unit recognizes the nonexistence of the control demand of the lighting device Ld (S7: No), the lighting device controlling unit performs the step S2 again. Similarly, when the lighting device controlling unit finishes sending the information to the target unit which send the acquisition demand, the lighting device controlling unit judges the existence or nonexistence of the control demand of the lighting device Ld through the middle network Nm. When the lighting device controlling unit recognizes the existence of the control demand of the lighting device Ld (S7: Yes), the lighting device controlling unit operates the lighting device according to the control demand. On the other hand, when the lighting device controlling unit recognizes the nonexistence of the control demand of the lighting device Ld (S7: No), the lighting device controlling unit performs the step S2 again. The steps S2 to S7 are repeated when the lighting device controlling units 1 is operated.

Figure 7:
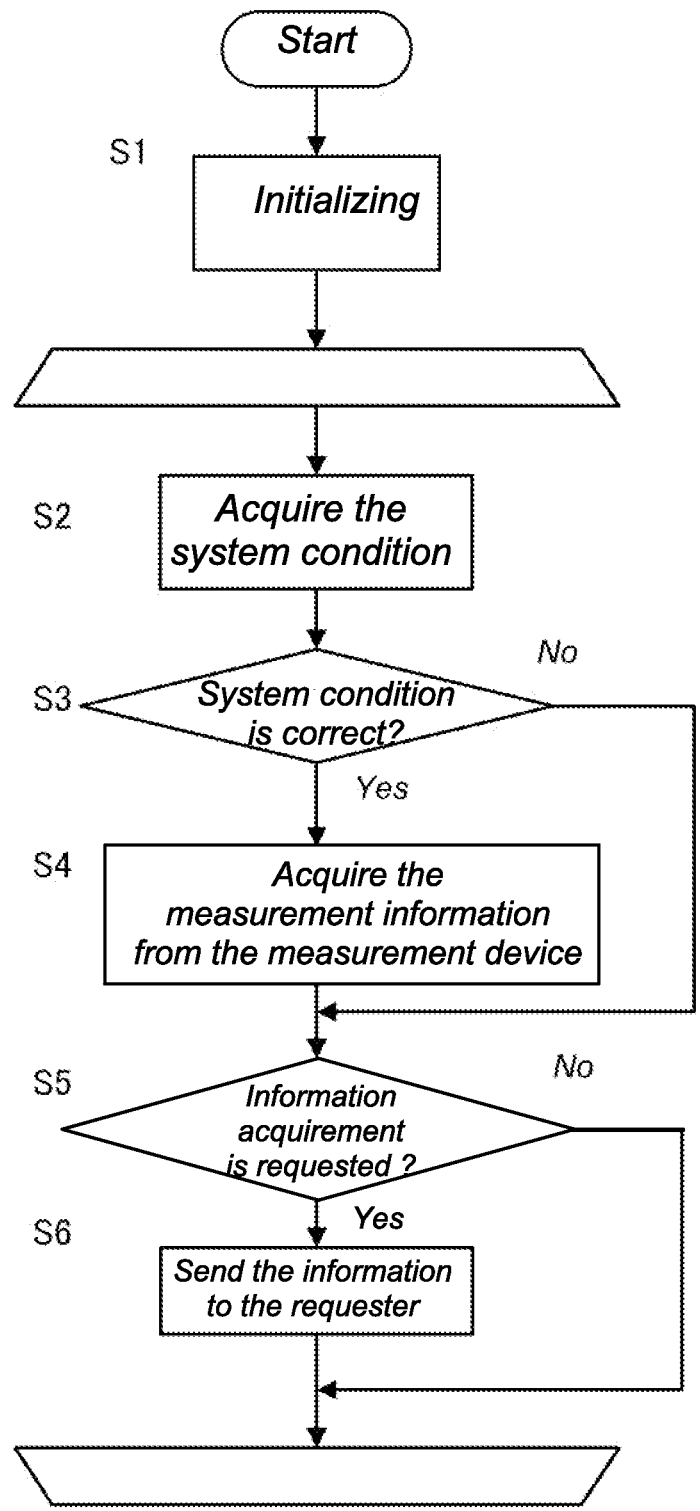
FIG. 7 shows a flow diagram of operation of a measuring controlling unit of the first and the second embodiments.

In the process of the measurement management unit 2, the control demand is omitted from the process of the lighting device controlling units 1. That is, the process of the measurement management unit 2 is shown as FIG. 7. When the measurement management unit 2 is started, the measurement management unit 2 performs the initializing process (S1). The measurement management unit 2 obtains the system condition with regard to the low network Ni2 (S2). This system condition includes open-close information, abnormal information, and so on. The open-close information is indicative of open or close of the signal line Ls2. The abnormal information is indicative of the abnormality of the measurement device Ms. When the system condition is normal (S3: Yes), the measurement management unit 2 obtains the measurement information from the measurement device Ms (S4).

When the measurement management unit 2 receives the acquisition demand for obtaining the system condition and the measurement information from the middle network Nm (S5), the measurement management unit 2 sends the system condition and the measurement information to a target unit which sends the acquisition demand (S6). (The target unit is ordinary equal to the area unit 3. However, as mentioned later, there is a possibility that the target unit is equal to the upper management unit 6.) When the measurement management unit 2 detects the abnormality of the system condition (S3: No), the measurement management unit 2 sends the abnormality to the target units.

On the other hand, when the measurement management unit 2 receives no acquisition demand from the middle network Nm, the measurement management unit 2 performs the step S2 again. The steps S2 to S5 are repeated when the measurement management unit is operated.

By the way, the area unit 3 further has a function of a time schedule control for controlling according to the time schedule by receiving the global group name with the time information from the upper management unit 6. In the time schedule control, the time information is added to the global group name. Therefore, the upper management unit 6 sends indication of "12:00, G1, turn on".

When the area unit 3 receives the indication of the time schedule control from the upper management unit 6, the area unit 3 stores the contents of the indication in the memory 11. Subsequently, the area unit 3 waits until the indicated time confirms to the time of the clock 14. When the indicated time confirms to the time of the clock 14, the area unit 3 transmit the local group name and the control information to the lighting device controlling unit 1. When this configuration is employed to the table in FIG. 4, the area unit 3 sends the local group name g1 to the lighting device controlling unit 1 having the management number of "lighting device—1". The area unit 3 sends the local group name g3 to the lighting device controlling unit 1 having the management number of "lighting device—2".

As mentioned above, in the case where the time schedule control is performed with developing the global group name after the indicated time confirms to the time of the clock 14, a large amount of memory size of the memory 11 is used for the time schedule control. Therefore, it is possible to employ the area unit 3 being configured to develop the local group name upon receiving the global group name with the time information from the upper management unit, and being configured to send the local group name with the time information to the lighting device controlling unit 1. In this case, when the time of the clock 14 confirms to the indicated time, the lighting device Ld is operated according to the control information.

In this case, the area unit 3 is configured to perform the time schedule control as mentioned above. Therefore, in a case where the upper management unit 6 transmits the global group name and the control information to each the areas E while indicating the time of the time schedule control, it is possible to vary the on state and the off state of the lighting devices Ld disposed in the management area A according to variation of the time.

In the time schedule control, because the time and the control information for controlling the lighting device Ld is designated, it is required to transmit the time schedule from the upper management unit 6 to the area unit 3 only once. Consequently, the area unit 3 transmits the local group name with the control information to the lighting device controlling unit in the areas E in sequence. Therefore, there is no need that the upper management unit 6 is connected to the area unit 3 because there is no need to synchronize the upper management unit 6 with respect to the area unit. Therefore, it is possible to operate the lighting device Ld autonomously.

As mentioned above, each the lighting device controlling units 1 and the measurement management units 2 has the hardware construction same as the area unit 3. However, the programs stored in the memories 11 of the lighting device controlling units 1 and the measurement management units 2 is different from the area units 3. In other words, the lighting device controlling unit 1, the measurement management unit 2, and the area unit 3 run only by changing the program respectively. The management unit 4 and a cooperative unit 8 as mentioned below are also has the same hardware construction with respect to the area unit 3, and different in running program from the area unit 3.

Each the lighting device controlling unit 1 and the measurement management unit 2 intermediate between the middle network Nm and the low networks Ni1, Ni2. Therefore, the memory 11 stores the address used in the middle network Nm and the addresses used in the low networks Ni1 and Ni2 is stored. The address used in the middle network Nm includes not only the IP address but also the identification information in the BACnet. The addresses used in the low network Ni1 and Ni2 are used for identifying the lighting device Ld or the measurement device Ms. The address of the measurement device Ms is used by the serial communication of the RS-485.

The lighting device controlling unit 1 has a monitoring function and a controlling function. The monitoring function is provided for monitoring the on state or the off state of the lighting device Ld, generating monitoring information indicating the on state or the off state of the lighting device Ld, and sending the monitoring information to the area unit 3. The controlling function is provided for receiving the control information from the area unit 3, and changing the on state or off state of the lighting device on the basis of the control information. The measurement management unit 2 has a monitoring function which is provided for obtaining the measurement information from the measurement device Ms and sending the measurement information to the area unit 3.

The lighting device controlling unit 1 always manages the lighting device Ld. The measurement management unit 2 always manages the measurement device Ms. Therefore, there is no need for the area unit 3 to always store the information with regard to the lighting device Ld and the measurement device Ms. That is, it is required for the area unit to have a function of temporally storing the information obtained by the communication with respect to the lighting device controlling unit 1 and the measurement management unit 2. In other words, it is possible to construct the area unit 3 by an embedded device having a little resource. In addition, the lighting device controlling unit 1 has the hardware construction which is same as the hardware constructions of the measurement management unit 2 and the area unit 3. Therefore, memory capacity of the memory 11 in the lighting device controlling unit 1 is same as memory capacities of the memory 11 in the measurement management unit 2 and the area unit 3. However, it is required for the memory 11 of the area unit 3 to have the memory size for temporarily storing the information obtained from the lighting device controlling unit 1 and the measurement management unit 2. Therefore, the area unit 3 has no problem with respect to the memory 11.

The management unit 4 has a memory 11 which is configured to store the addresses corresponding to the lighting device controlling units 1, the measurement management units 2, and the area unit 3 in the middle network Nm. The management unit 4 is configured to transmit the existence acknowledgement packet which is used by the BACnet protocol such that the management unit 4 obtains the addresses of the lighting device controlling units 1, the measurement management units 2, and the area unit 3. Furthermore, the measurement management unit 4 has a backup function. The backup function is configured to collect information required for managing the devices such as the lighting devices Ld which construct the low network Ni1 and the measurement management unit 2 which construct the low network Ni2 managed under the lighting device controlling units 1 and the measurement management units 2 having the addresses stored in the memory 11. The backup function is configured to store the information required for managing the devices in the memory. The information of the addresses in the middle network Nm and the information required for managing the devices are hereinafter referred to as setting information. Therefore, the management unit 4 has the backup function for the setting information.

The management unit 4 further has a system condition informing function and a web service function in addition to the backup function. The system condition informing function is provided for storing a history of the system condition of alarm information in the memory 11, and provided for informing the history of the system condition of the alarm information to the upper management unit 6. The web service function is provided for displaying the setting information on the upper management unit 6. That is, the setting information held by the management unit 4 is visualized by the upper management unit 6. These functions in the measurement unit 4 are implemented by the signal processor 10 which runs the program stored in the memory 11.

The management unit 4 repeatedly sends the acquisition demand such that the lighting device controlling units 1, the measurement management unit 2, and the area unit 3 send the information for backup to the management unit 4. Each one of the lighting device controlling units 1, the measurement management unit 2, and the area unit 3 compare the information at the last time and the information obtained at this time. When the information at the last time is same as the information obtained at this time, each one of the lighting device controlling units 1, the measurement management units 2, and the area unit 3 send no information to the management unit 4. On the other hand, when the information at the last time is different from the information obtained at this time, each one of the lighting device controlling units 1, the measurement management units 2, and the area unit 3 send the information to the management unit 4. With this operation, the management unit 4 stores latest information of the operation of the lighting device controlling units 1, the measurement management unit 2, and the area unit 3 in the memory 11.

As mentioned above, the router 5 is provided between the high network Ns and the middle network Nm. This router 5 acts as the area separating device. In the middle network Nm, the communication packet is broadcasted. The router 5 acting as the area separating device is configured to prevent the communication packet from leaking to an outside of the sub area E. However, the router 5 is configured to permit communication packet between the upper management unit 6 and the area unit 3.

That is, in the communication between the area unit 3 and the upper management unit 6, the area unit 3 sends a reply demand by the HTTP (Hyper Text Transfer Protocol) to the upper management unit 6. Upon receiving the reply demand, the upper management unit 6 communicates with the area unit 3 to reply to the reply demand. When there is information to send from the area unit 3 to the upper management unit 6, the area unit 3 sends the information when the area unit 3 issues the reply demand. In addition, when there is information to send from the upper management unit 6 to the area unit 3, the upper management unit 6 sends the information when the upper management unit 6 replies to the reply demand. In this manner, the communication between the upper management unit 6 and the area unit 3 is established without interruption of the router 5.

That is, each the area unit 3 and the management unit 4 manages the lighting device controlling units 1, the measurement management unit 2, the devices (the lighting devices Ld, the measurement devices Ms) in the low networks Ni1 and Ni2. In addition, each the area unit 3 and the management unit 4 recognizes the setting information of the lighting device controlling units 1, the measurement management unit 2, the devices (the lighting devices Ld, the measurement devices Ms) in the low networks Ni1 and Ni2. Therefore, the packet such as the existence acknowledgement packet sent by the broadcast is required to reach to the sub area E. Therefore, it is possible that the router prevents the communication packet from leaking to the outside of the sub area. E. In addition, upper management unit 6 disposed in the outside of the area E communicates with the area unit 3. Therefore, the transmission and reception of the information between the upper management unit 6 and the units (the lighting device controlling units and the measurement management unit 2) is established through the area unit 3.

As mentioned above, the router 5 acts as the area separating device which is configured separate the sub area E. Therefore, when there is a requirement to increase the lighting devices Ld and the measurement devices Ms in the sub area E, it is possible to employ the lighting device controlling units 1 and the measurement management units 2 without modification. In addition, it is also possible to divide the area by using a new area unit 2, a new management unit 4, and a new router 5. Therefore, it is easy to expand the system even if the number of the devices (the lighting devices Ld and the measurement devices Ms) increases.

Each the lighting device controlling units 1 and the measurement management unit 2 has web service function similar to the area unit 3 and the management unit 4. Due to the web service function, the information for managing the devices (the lighting devices Ld and the measurement devices Ms) connected to the low networks N11, and Ni2 is visualized by the upper management unit 6. However, the web service functions of the lighting device controlling units and the measurement management units 2 are always disabled. The information for managing the area E is displayed on the upper management unit 6 by the web service function of the area unit 3. On the other hand, when the area unit 3 sends no reply with respect to the existence acknowledgement packet in the middle network Nm, the web service functions of both the lighting device controlling units 1 and the measurement management units 2 is enabled.

That is, in a case where there is a necessity to manage the area E while the area unit 3 is disabled, the upper management unit 6 manages the area E by using the web service functions of the lighting device controlling units 1 or the measurement management units 2. That is, the area unit 3 is interposed between the upper management unit 6 and the units (the lighting device controlling units 1 and the measurement management units 2). Consequently, the upper management unit 6 is configured to manage the devices (the lighting devices Ld, and the measurement devices Ms) together with each other. In addition, when the area unit 3 is failed, the upper management unit 6 communicates with the devices (the lighting device controlling units and the measurement management units 2) directly, and manages the devices (the lighting device controlling units 1 and the measurement management units 2) urgently. Therefore, it is possible to repair and replace the area unit 3 without stopping the operation of the lighting devices Ld and the measurement devices Ms.

In addition, the memory 11 of the management unit 4 stores the information for backup. Therefore, when the area unit 3 is repaired or replaced, the information for back up is transmitted to the repaired or replaced area unit 3 from the memory 11 of the management unit 4. Consequently, the area unit 3 is restored. Moreover, with the above configuration, the low networks Ni1 and Ni2 operates autonomously. Therefore, the lighting devices Ld and the measurement devices Ms operates continuously even if the communication of the middle network Nm is disabled. Similarly, the lighting device Ld and the measurement devices Ms operates continuously even if the communication of the high network Ns is disabled. In addition, the area unit 3 is configured to communicate with every sub area E. Therefore, disconnection between the area unit 3 and the upper management unit 6 in one of the areas E causes no influence to the other areas E. Therefore, it is possible to maintain every area E.

Second Embodiment

In the first embodiment, the lighting device controlling units 1 and the measurement management units 2 are provided for intermediating between the middle network Nm and the low networks Ni1, Ni2 in the area E. However, the second embodiment further comprises a cooperative unit 8 in addition to the lighting device controlling units 1 and the measurement management units 2 shown in broken line in FIG. 1. The number of the lighting device controlling unit and the measurement management units 2 is not limited in the sub area E. However, single cooperative unit 8 is disposed in the sub area E. The cooperative unit 8 is configured to be connectable to a transmission device CN, an operation terminal unit TU1, and a control terminal unit TU2.

However, the operation terminal unit TU1 connected to the cooperative unit 8 is provided with an input terminal. This input terminal is different from the switch SW. The input terminal is provided for receiving input. When one of the operation terminal units TU1 connected to the cooperative unit 8 receive a predetermined input, the one of the operation terminal unit TU1 send the control demand to the other lighting device controlling units 1. Therefore, when the cooperative unit 8 receives a predetermined input through the signal line Ls1 and the input terminal, the cooperative unit 8 sends the control demand to the lighting device controlling units 1 in order to turn on or turn off the lighting devices Ld under the management of the lighting device controlling units 1.

For example, the cooperative unit 8 is connected to a television camera of a shooting system through the input terminal of the operation terminal unit TU1. The shooting system is configured to recognize a predetermined input which corresponds to a start of shooting by the television camera. When the shooting system recognizes a predetermined input, the cooperative unit 8 triggers the lighting devices Ld under the management of the lighting device controlling units 1 to turn on. In this manner, it is possible to use the lighting devices Ld interlocked with the shooting system.

The above processing in the cooperative unit 8 is capable of incorporating into the lighting device controlling units 1. However, it is possible to dispose the cooperative unit 8 independent from the lighting device controlling units 1. With this configuration, it is possible to increase the number of the system interlocked with the cooperative unit 8. Therefore, it is possible to obtain the cooperative unit 8 which is in cooperation with the lighting device controlling units 1. It is noted that the system disclosed in the second embodiment further includes the components explained in the first embodiment.

Third Embodiment

Each the first embodiment and the second embodiment includes three hierarchy levels of the high network Ns, the middle network Nm, and the low networks Ni1, Ni2. In the first embodiment and the second embodiment, the high network Ns is separated from the middle network Nm by the router 5. However, when the devices (the lighting devices Ld, the measurement devices Ms) are increased, it is preferred to divide the sub area E. In addition, it is desired to manage a plurality of the sub areas E simultaneously. When the sub area E is divided into a plurality of areas, it is preferred to deal with thus divided sub areas as the sub areas E.

In view of the above, a case where the management area includes a plurality of regions each of which has a plurality of the sub areas E is hereinafter explained. It is possible to apply this case with respect to the hierarchized region. When the device management system is applied to a network having plural hierarchy levels, the router 5 is disposed in an arbitrary position. It is preferred that the router 5 is disposed in each sub areas E in order to prevent the increase of the traffic in the high network Ns. However, the position of the router 5 is not especially considered in the following explanations.

In addition, as explained in the first embodiment, the area unit 3 is configured to communicate with the devices (the lighting device controlling units 1 and the measurement management units 2), and also configured to communicate with the upper management unit 6. However, the devices (the lighting device controlling units 1 and the measurement management units 2) are configured to establish no communication with respect to the upper management unit 6 directly. Therefore, the area unit 3 logically acts as an internal node which is located between the upper management unit 6 and the devices (the lighting device controlling units 1 and the measurement management units 2). Thus, in order to construct the network having a plurality hierarchy level, the area unit 3 is used as a node.

Figure 8:
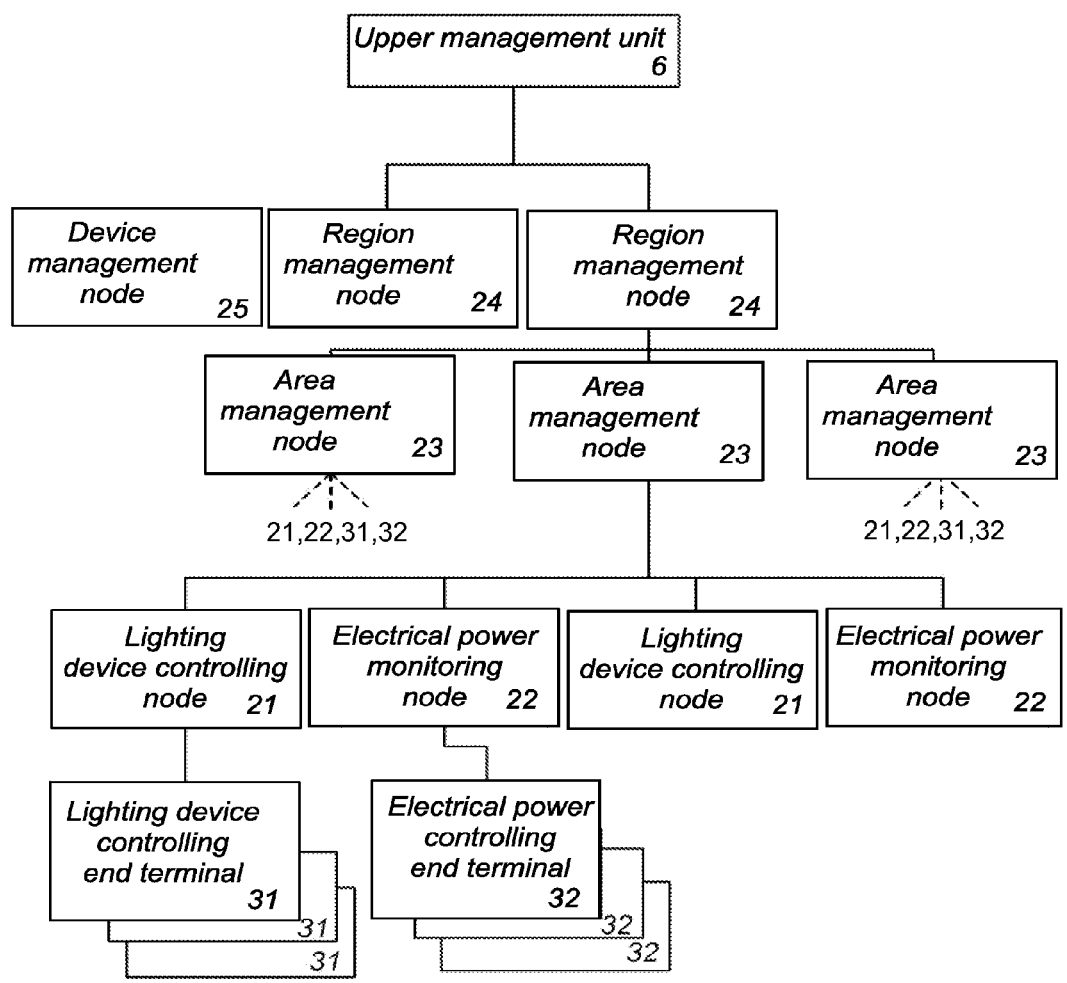
FIG. 8 shows a block diagram of a third embodiment.

That is, as shown in FIG. 8, the area unit 3 corresponds to an area management node 23 which is a network device act as the internal node. The lighting device controlling unit 1 corresponds to a lighting device controlling node 21 which acts as an inferior node. The measurement management unit 2 corresponds to an electrical power monitoring node 22 which acts as an inferior node. The lighting device controlling node 21 and the electrical power monitoring node 22 is connected to the area management node 23 such that the lighting device controlling node 21 and the electrical power monitoring node 22 is located in the lower side hierarchy level than the area management node 23. In addition, a region management node 24 is disposed so as to be located in an upper side hierarchy level than the area management node 23. The region management node 24 acts as a superior node. The region management node 24 is configured to communicate with the upper management unit 6. Each one of the lighting device controlling node 21, the electrical power monitoring node 22, the area management node 23, the region management node 24, and the upper management unit 6 shares a transmission path in common. The transmission path which meets the Ethernet (registered trademark) is used.

As mentioned above, because each one of the lighting device controlling node 21, the electrical power monitoring node 22, the area management node 23, the region management node 24, and the upper management unit 6 shares a transmission path in common, the each nodes 21 to 24 constructs the logically hierarchized structure. The logically hierarchized structure means that each the node 21 to 24 is configured to communicate with predetermined nodes. Normally, the lighting device controlling node 21 and the electrical power monitoring node 22 are configured to communicate with the area management node 23. The area management node 23 is configured to communicate with the region management node 24. The upper management unit 6 is configured to communicate with only the region management node 24. However, if needed, the region management node 24 communicates with each one of the lighting device controlling nodes 21 and the electrical power monitoring nodes 22. In addition, it is possible to for the devices in the high side hierarchy level to communicate with the devices in the lower side hierarchy level with passing through the internal nodes 22 to 24 between the node of the high side hierarchy level and the node of the low side hierarchy level.

In this embodiment, the transmission device CN acts as a lighting device controlling end terminal 31 which is connected to the signal line Ls1. The lighting device controlling end terminal 31 is connected to the lighting device controlling node 21 so as to be located in a low side hierarchy level with respect to the lighting device controlling node 21. The electrical power monitoring node 22 is connected to an electrical power monitoring end terminal 32 such that the electrical power monitoring end terminal 32 is located in the low side hierarchy level of the electrical power management node. The electrical power monitoring end terminal 32 is configured to intermediate with the measurement device Ms connected to the signal line Ls2. The lighting device controlling end terminal 31 is configured to hold the information of the control definition table which is used for group processing and the pattern processing. That is, the configuration in FIG. 1 shows the lighting device controlling units 1 which is connected to the signal line Ls1 which is connected to the transmission device CN. However, in this embodiment, the lighting device controlling end terminals 31 are connected to the lighting device controlling node 21. Similarly, the electrical power monitoring end terminal 32 is interposed between the signal line Ls2 and the electrical power monitoring node 22. The electrical power monitoring end terminal 32 is configured to obtain an electrical current and an electrical power from the measurement device Ms, and store the history of the measurement information periodically (every 10 minute, every 1 day, and so on.).

Figure 9:
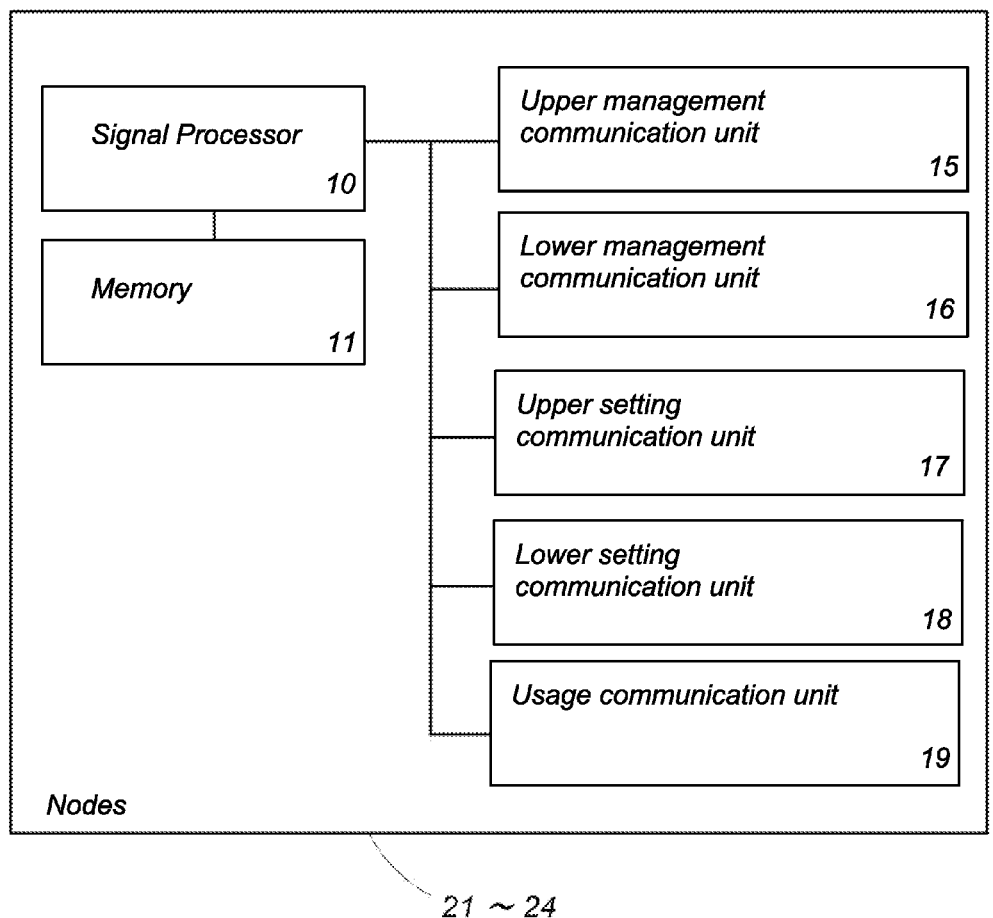
FIG. 9 shows a block diagram of the node of the third embodiment.

On the other hand, the area unit 3 is configured to send the control information, the measurement information, the monitoring information, and the setting information from the communication processors 12*a* to 12*d* and the communication ports 13*a* to 13*d*. The area unit 3 has a function of passing the information transmitted and received between the devices in the high side hierarchy level and the devices in the low side hierarchy level. The area unit 3 has a function of editing the information and transmitting thus edited information to the devices in the high side or low side hierarchy levels. Each the nodes 21 to 24 has configuration which is same as the configuration of the area unit 3. However, in order to explicitly explain the function of the system having the logically hierarchized structure, the nodes 21 to 24 are explained according to the configurations in FIG. 9.

That is, each the nodes 21 to 24 has an upper management communication unit 15 and a lower management communication unit 16 each of which is configured to communicate with the nodes in the high side hierarchy level and the low side hierarchy level in order to transfer and receive the control information, the measurement information, and the monitoring information. In addition, the each the nodes 21 to 24 has an upper setting communication unit 17 and a lower setting communication unit 18 each of which is configured to communicate with the nodes in the high side hierarchy level and the low side hierarchy level in order to transfer and receive the setting information. In addition, each the nodes 21 to 24 further has a usage communication unit 19. The nodes 21 to 24 are connected to an operation and display device which is not shown and which acts as a user interface. It is noted that the clock 14 is not omitted in FIG. 9.

The operation and display device is operated in order to manage and set the nodes in the low side hierarchy level by the user. The operation and display device is configured to display the information stored in the memory 11. That is, the operation and display device is configured to display the information for setting of the operation and the data stored in the memory. The operation and display device is used to set the control demand, the condition collection demand, a reference demand of referring the setting information, the setting demand for setting the setting information. It is noted that the memory 11 stores the system program for operation of the signal processor 10, setting information (for communication, schedule, a control group, total information, threshold, and analysis parameter) for operation, and the information obtained from the node in the low side hierarchy level.

The operation and display device is exemplified by a dedicated device with a liquid crystal display and a personal computer. The operation and display device is connected to the nodes 21 to 24 through the usage communication unit 19. Furthermore, it is possible to incorporate the operation and display device with the usage communication unit 19 into the nodes 21 to 24. When the operation and display device is incorporated into the nodes 21 to 24, it is possible to use the nodes 21 to 24 having the liquid crystal display with switches. The nodes 21 to 24 having a touch panel is also used as the operation and display device incorporated into the nodes 21 to 24. Furthermore, it is possible for the operation and display unit to provide server function and a browser. With this configuration, it is possible to manage and set the nodes located in the low side hierarchy level of the nodes 21 to 24. Consequently, it is possible to enhance the general versatility.

The upper management communication unit 15 is configured to communicate with the nodes in the high side hierarchy level. The upper management communication unit 15 has a function of receiving the control demand from the nodes in the high side hierarchy level. The upper management communication unit 15 has a function of sending the condition and a condition variation to the nodes in the high side hierarchy level. The control demand is such as the individual processing, the group processing, and the pattern processing which are sent to the lighting devices Ld disposed in the low side hierarchy level. The condition which is sent to the node in the high side hierarchy level is equal to the operation condition of the lighting device Ld in the low side hierarchy level, and the measurement information (instantaneous value and integration value) obtained by the measurement device Ms in the low side hierarchy level. The condition variation which is sent to the nodes in the high side hierarchy level includes the variation of the on state or off state of the lighting devices Ld in the lower side hierarchy level, and the variation of the magnitude relation between the threshold and the measurement information measured by the measurement device Ms in the lower side hierarchy level. The threshold is used for judging the existence or nonexistence of the abnormality.

On the other hand, the lower management communication unit 16 is configured to communicate with the upper management communication unit 15 of the nodes 21 to 24 in the low side hierarchy level. The lower management communication unit 16 has a function of transmitting the control demand to the nodes in low side hierarchy level, and a function of receiving the condition and/or condition variation from the nodes in the lower side hierarchy level.

The upper setting communication unit 17 is configured to communicate with the lower setting communication unit 18 of the nodes 21 to 24 located in the high side hierarchy level. The upper setting communication unit 17 has a function of receiving the setting information for operation of the nodes 21 to 24 from the nodes in the high side hierarchy level, and storing the setting information in the memory 11. The upper setting communication unit 17 has a function of transmitting the setting information in the memory 11 to the nodes in the high side hierarchy level according to the reference demand of the setting information. The setting information for operation is exemplified by information for scheduled control, information of the control definition table for the group processing and the pattern processing, and the parameter for collecting and counting the information sent from the nodes in the low side hierarchy level.

On the other hand, the lower setting communication unit 18 has a function of transmitting the setting information for operation of the low side hierarchy level, and a function of receiving the setting information which is read out from the memory 11 of the nodes 21 to 24 located in the low side hierarchy level according to the reference demand of the setting information.

In the communication between the nodes 21 to 24, the upper management communication unit 15 and the upper setting communication unit 17 are defined as a server. On the other hand, the lower management communication unit 16 and the lower setting communication unit 18 are defined as a client. Therefore, the upper management communication unit 15 and the upper setting communication unit 17 are cooperative with the lower management communication unit 16 and the lower setting communication unit 18 to construct the client-server type system so that the communication between the upper management communication unit 15 and the lower management communication unit 16, and the communication between the upper setting communication unit 17 and the lower setting communication unit 18 are established. The protocol in the client-server type system is exemplified by SOAP (Simple Object ccess Protocol), TCP (Transmission Control Protocol), UDP (User Datagram Protocol), BACnet protocol (A Data Communication Protocol for Building Automation and Control Networks), and FTP (File Transfer Protocol). In addition, it is possible to use the nodes in the low hierarchy level as the server instead of the client, and to use the nodes in the upper hierarchy level as the client instead of the server. Moreover, it is also possible to use the nodes each of which acts as the client as well as the server.

The usage communication unit 19 is configured to communicate with the operation and display device via the HTTP. When the signal processor 10 is requested to send the contents from the usage communication unit 19, the signal processor produces contents from the data for producing the contents and the data stored in the memory 11. Subsequently, the signal processor 10 transmits the contents to the operation and display device through the usage communication unit 19.

The signal processor 10 which construct each the node 21 to 24 performs the following processes. When the nodes 21 to 24 receive the control demand from the high side hierarchy level through the upper management communication unit 15, the signal processor 10 performs either one of following two processes. One process is to send the control demand to the nodes in the low side hierarchy level from the lower management communication unit 16. One process is to obtain the data stored in the memory 11 according to the control demand, and then to send the control demand with the data more than once to the nodes in the low side hierarchy level from the lower management communication unit 16. In addition, when the signal processor 10 receives the acquisition demand from the nodes in the high side hierarchy level through the upper management communication unit 15, the signal processer 10 performs either one of following two processes. One process is to send the acquisition demand to the nodes in the low side hierarchy level through the lower management communication unit 16, and also to send the information received from the nodes in the low side hierarchy level to the nodes in the high side hierarchy level through the upper management communication unit 15. One process is to obtain the data stored in the memory 11 according to the acquisition demand, and also send the data to the nodes in the high side hierarchy level through the upper management communication unit 15.

When the nodes 21 to 24 receive the setting demand from the nodes in the upper side hierarchy level through the upper setting communication unit 17, the signal processor 10 performs either one of following two processes. One process is to store the setting information of the setting demand in the memory 11. One process is to send the setting information of the setting demand to the nodes in the low side hierarchy level. When the nodes 21 to 24 receive the acquisition demand of obtaining the setting information stored in the memories 11 of the nodes 21 to 24 via the upper setting communication unit 17, the signal processor 10 performs either one of following two processes. One process is to send the acquisition demand to the nodes in the low side hierarchy level through the lower setting communication unit 18, and subsequently to send the setting information transmitted from the nodes in the low side hierarchy level to the nodes in the high side hierarchy level through the upper setting communication unit 17. One process is to obtain the setting information stored in the memory 11, and subsequently to send the setting information to the nodes in the high side hierarchy level from the upper setting communication unit 17.

In addition to the above process, the signal processor 10 is configured to send the control demand to the nodes in the low side hierarchy level from the lower management communication unit 16. The signal processor 10 is configured to send the acquisition demand of the information to the lower side hierarchy level from the lower management communication unit 16, and also configured to send the information sent from the nodes in the low side hierarchy level upon receiving the reply from the nodes in the low side hierarchy level. The signal processor 10 is configured to send the acquisition demand of the information from the lower management communication unit 16, receive the information from the nodes in the low side hierarchy level, and subsequently store the information in the memory 11. The signal processor 10 is configured to send the information stored in the memory 11 to the nodes in the high hierarchy level from the upper management communication unit 15. The signal processor 10 is configured to collect the information stored in the memory 11, is configured to make up, edit, and analyze thus collected information, and then is configured to restore the edited and analyzed information in the memory 11.

Figure 10:
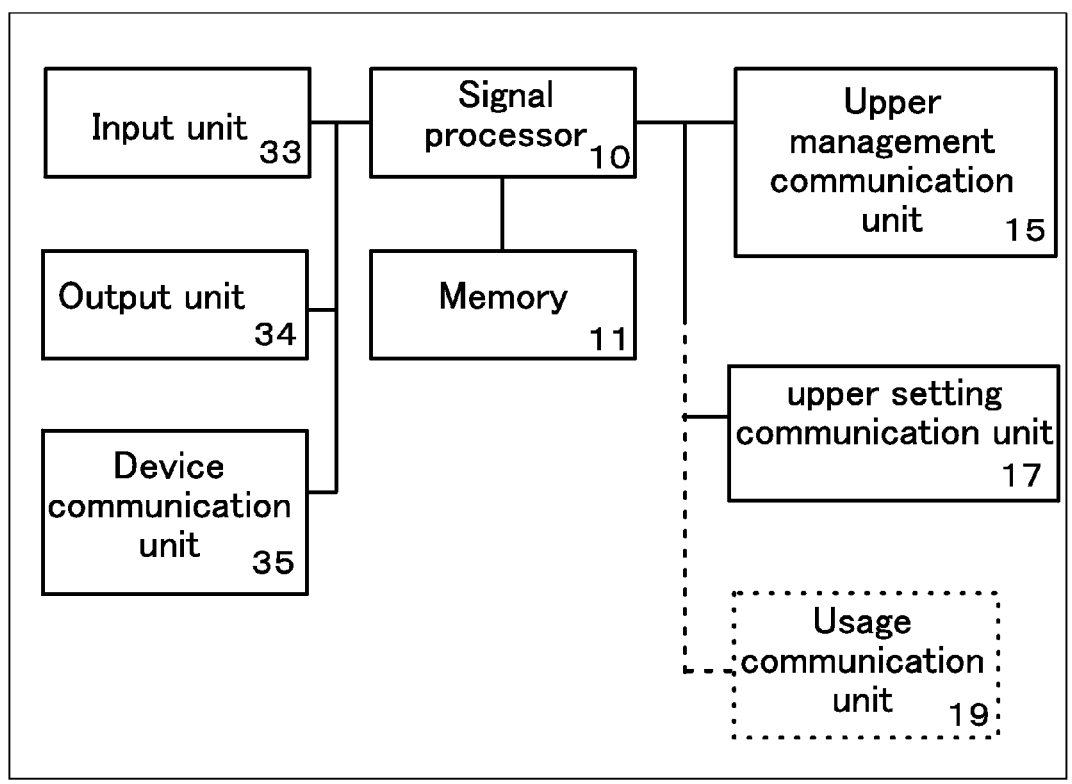
FIG. 10 shows a block diagram of the end terminal of the third embodiment.

The above configuration relates to the nodes 21 to 24. However, the lighting device controlling end terminals 31 and the electrical power monitoring end terminals 32 basically have the same configurations of the nodes 21 to 24. Each the end terminal has the configurations of FIG. 10 which is similar to the configurations of FIG. 9. However, each the end terminal have an input unit 33, an output unit 34, a device communication unit 35 instead of the lower management communication unit 16 and the lower setting communication unit 18. The numbers of the input device 33, the output device 34, and the device communication unit 35 is determined arbitrary.

The input unit 33 is provided for inputting on-off signal and analog signal. The output unit 34 is provided for outputting the on-off signal and the analog signal. The input unit 33 and the output unit 34 are directly connected to the devices without communication. In addition, the device communication unit 35 is configured to communicate with the devices when the device communication unit 35 is connected to the signal lines Ls1 and Ls2. Unit specifications of the device communication units 35 are arbitrary determined according to the devices connected to the device communication unit 35. For example, it is possible to employ a device communication unit being configured to communicate in poling method with the devices of central control type. It is also possible to employ a device communication unit being configured to communicate in contention method with the devices of distributed control type. In addition, it is also possible to employ a device communication unit being configured to send a control command such as DX512.

In the structure of FIG. 8, the lighting device controlling node 21 is configured to communicate with the lighting device controlling end terminal 31 in the low side hierarchy level. The setting of the group processing and the pattern processing in the lighting device controlling node 21 is set by the operation and display device. In addition, the lighting device controlling node 21 is configured to control the lighting device controlling end terminal 31 by using a previously determined schedule. In addition, the electrical power monitoring node 22 is configured to communicate with the electrical power monitoring end terminal 32 in the low side hierarchy level. The electrical power monitoring node 22 is configured to store the measurement information measured by the measurement device Ms, and is configured to make up the collected data in every groups by using group information which is previously determined. It is also possible for the electrical power monitoring node 22 to calculate counting values periodically when the electrical power monitoring node 22 collects the data. The data stored in the electrical power monitoring end terminal 32 is displayed by the operation and display device.

The area management node 23 is configured to communicate with a plurality of the lighting device controlling nodes 21 in the low side hierarchy level, and is configured to communicate with a plurality of the electrical power monitoring nodes 22 in the low side hierarchy level. Consequently, the area management node 23 is configured to collect control condition of the lighting device, and collect the measurement data which is measured by the electrical power monitoring node 22. In addition, the area management node 23 is operated by the operation and display device such that the area management node 23 performs the pattern processing. Consequently, the area management node 23 controls a plurality of the lighting device such that one group of previously determined lighting devices is turned on and the other group of previously determined lighting device is turned off. In addition, area management node 23 is configured to group a plurality of the electrical power monitoring nodes 22. With this configuration, the area management node 23 is configured to collect the data from each the electrical power monitoring node 22, and is configured to count the data every groups. In this case, when the collected data exceeds the predetermined threshold, it is possible for the area management node 23 to operate a group of the lighting devices such that a group of the lighting devices saves consumption energy which is predetermined.

The region management node 24 is configured to communicate with a plurality of the area management node 23 in the low side hierarchy level. The region management node 24 is basically configured to intermediate communication between the upper management node 6 and the area management node 23. In addition, the region management node 24 is configured to communicate in the encrypted communication with the lighting device controlling node 21, the electrical power monitoring node 22, and the area management node 23 via the upper management communication unit 15, the upper setting communication unit 17, and the usage communication unit 19. Similar to the area management node 23, the region management node 24 is configured to group the lighting devices in the lower side hierarchy level. However, the region management node 24 counts no measurement information measured by the measurement device Ms.

Hereinafter, a case of the communication is explained as follows. As mentioned in the first embodiment, when the lighting device controlling end terminal 31 operates the lighting devices Ld, the lighting device controlling end terminal 31 performs the individual processing and the bulk control instruction. When the switch SW of the operation terminal unit TU1 is operated, a signal indicative of that the switch SW of the operation terminal unit TU1 is operated is transferred to the lighting device controlling end terminal 31 through the signal line Ls1. Upon receiving the signal indicative of that the switch SW of the operation terminal unit TU is operated, the lighting device controlling end terminal 31 refers the table which is set in the lighting device controlling end terminal 31. (When the lighting device controlling end terminal 31 is set to operate the lighting devices according to the bulk control instruction, the lighting device controlling end terminal 31 refers the control definition table.) Subsequently, the lighting device controlling end terminal 31 send a signal indicative of operation of the controlled lighting devices which is connected to the control terminal unit TU2 through the signal line Ls1. When the lighting device controlling end terminal 31 is set to operate the lighting device according to the individual processing, each the switch SW is related to each the lighting device Ld on one-on-one level. On the other hand, when the lighting device controlling end terminal 31 is set to operate the lighting device according to the bulk control instruction, the lighting device controlling end terminal develops the control definition table in order to obtain the relationship between the switch SW and a plurality of the lighting devices. Subsequently, the lighting device controlling end terminal 31 sends the signal indicative of the operation of the controlled lighting devices individually through the control terminal unit TU2.

On the other hand, the electrical power monitoring end terminal 32 receives the measurement information from the measurement device Ms through the signal line Ls2, and store the measurement information. Meanwhile, it is possible to employ the measurement device Ms being configured to send the measurement information to the electrical power monitoring end terminal 32 autonomously. In addition, instead of this configuration, it is possible to employ the electrical power monitoring end terminal 32 being configured to request the measurement information to each the measurement device Ms in order.

Each one of the nodes 21 to 24 basically communicates with the other nodes by using a packet having a format shown in FIG. 11. That is, the packet includes data of "source ID", "destination ID", "command", "command data 1", "command data 2", . . . , and "command data n". The ID is equal to an identification data for recognizing each the nodes 21 to 24. Each the node 21 to 24 acts as parent node with respect to the low side hierarchy level system. The nodes 21 to 24 which act as the parent nodes have correspondence tables which include relationships between the IDs of the nodes 21 to 24 and the IP addresses of the nodes 21 to 24, respectively. In addition, the nodes 21 to 24 located in the lower side hierarchy level system respectively have the IDs of the parent nodes and the IP addresses of the parent nodes. Therefore, the nodes 21 to 24 are configured to determine the IP address on the basis of the "source ID".

It is possible for "destination ID" to include a plurality of the IDs in order to determine a communication path. Each of the IDs is separated by arbitrary punctuations. In a case where the system has four hierarchy levels of A level, B level, C level, and D level, the destination ID includes alphabets A to D which are hyphenated with the numbers (1, 2, . . . ) for distinguishing the nodes in each the hierarchy level, respectively.

When the packet has "source" ID which is equal to "A–1" and the destination ID which is equal to "B–1", there is no need to indicate the communication path because the packet is transmitted to a neighbor hierarchy level. However, when the packet has "source ID" which is equal to "A–1" and "destination ID" which is equal to "D–1", the packet is transmitted over three hierarchy level. Therefore, there is a necessary to indicate the communication path for transmitting the packet over the three hierarchy level.

Following two methods are prepared for indicating the communication path. One method is to send a packet having "destination ID" of the adjacent hierarchy level and having a command data including a plurality of IDs indicative of the communication path. One method is to send a packet having "destination ID" which includes a plurality of the IDs indicative of the communication path. In the method of the former, the nodes 21 to 24 in the neighbor hierarchy level read the ID in the command data, rewrite "destination ID" indicative of the nodes in the next hierarchy level, and subsequently delete the ID of the next hierarchy level from the command data. In the method of the latter, when the packet has "destination ID" which includes a plurality of the IDs, one of the nodes 21 to 24 corresponding to a header of a plurality of the IDs in "destination ID" is determined as the destination node. On the other hand, when the nodes receives the packet which includes a plurality of the IDs, the nodes deletes the header ID and subsequently send the packet to the nodes 21 to 24 which corresponds to a new header ID.

The command is exemplified by "On control", "Through on control", "Event", "Through event", "Service request", "Configuration request", "Acknowledgement", and "Negative acknowledgement". "On control" represents turning on of the lighting device Ld. "Event" represents sending the event which is included in the command data. "Through on control" and "Through event" represent sending the "On control" and "Event" to "destination IDs" of the ultimate node from the source node with passing through the nodes between the source node and the ultimate node. "Service request" represents requesting a list of the service. "Configuration request" represents to request a list of the configurations. "Acknowledgement" represents the reply with respect to the reception of the packet. "Negative acknowledgement" represents the reply with respect to no reception of the packet. When "Negative acknowledgement" is sent, coded reason of the negative acknowledgement is added as the command data.

Hereinafter, operation in the communication path is explained on the basis of the condition where the packet is transmitted with "On control" and "Through on control". In both the cases, the packet is transmitted to the node A-1 to the node D-1. Consequently, the lighting device Ld is controlled by the switch SW having the address 2-4. In addition, in this explanation, the packet is transmitted through the communication path from the node A-1 through the nodes B-1 and C-1 to the node D-1. The operation terminal unit TU1 is shaped to be connected to four switches SW. The control terminal unit TU2 is shaped to be connected to the four lighting devices Ld. The address of the switch SW is represented by the address of the switch SW with hyphenated circuit number for distinguishing the switches SW from the lighting devices Ld. For example, the address 2-4 represents the switch SW having the circuit number of "4" of the terminal unit TU1 having the address of "2".

When the packet has "On control", "destination ID" is determined as the node B-1 which is neighbor to the node A-1. In addition, the command data of the packet is determined to include the node C-1, the node D-1, and the switch SW having the address 2-4. The nodes C-1 and D-1 in the command data indicate the communication path. The address 2-4 of the switch SW corresponds to the lighting devices Ld. Therefore, the switch SW having the address indicates the lighting device Ld which is controlled. When the node B-1 receives this packet, the node B-1 rewrites "destination ID" as the node C-1. In addition, the node B-1 deletes the node C-1 in the command data. That is, the node B-1 sends the packet which is destined to the node C-1. When the node C-1 receives this packet, the node C-1 rewrites "destination ID" as the node D-1. In addition, the node C-1 deletes the node D-1 in the command data. Consequently, the node C-1 sends the packet which is destined to the node D-1. The node D-1 receives this packet. Consequently, the node D-1 operates the lighting device Ld such that the lighting device Ld is operated by the switch SW.

On the other hand, when the command has "Through on control", the node A-1 set the destination ID as "B-1":"C-1":"D-1". In addition, the node A-1 determines the command data such that the switch having the address of "2-4" is operated. This packet is received by the node B-1 because a header of "destination ID" is equal to node B-1. When the node B-1 receives this packet, the node B-1 deletes the "B-1" from the destination ID, and subsequently sends the packet having "destination ID" of "C-1" "D-1". This packet is received by the node C-1 because the header of "destination ID" is equal to node C-1. In this manner, similar process is repeated. As a result the packet having the command data of the address 2-4 is received by the node D-1. When the node D-1 receives the packet, the destination ID has no data. Therefore, the node D-1 operates the lighting device Ld having the address 2-4 such that the switch SW is operated.

In "On control" and "Through on control", "destination ID" is determined to have the nodes 21 to 24 in the inverse order with respect to the above. Consequently, operation result is sent to the superior nodes. However, in "On control", each the nodes 21 to 24 in the communication path stores the operation condition of the lighting device Ld. On the other hand, in "Through on control", the nodes between the source node and the destination node do not store the operation condition of the lighting device LD but pass the operation condition. Therefore, in "Through on control", only the source node holds the operation information. As a result, the nodes between the source node and the destination node is not required to have sufficient hardware resource such as capabilities of the CPU, memory 11, and so on. On the other hand, in "On control", it is possible for each the nodes to send the operation condition on the basis of the operation condition stored in the memory 11. That is, it is possible for the nodes to send the operation condition without identifying the operation condition to the nodes in the low side hierarchy level. Therefore, either one of "On control" or "Through on control" is arbitrary selected according to situation.

Next, a condition where the packet having the command with "Event" is transmitted is explained. The explanation is performed on the basis of the condition where the node D-1 give the variation of the lighting device Ld connected to the node D-1 to the node A-1. Although the node A-1 located in the high hierarchy level send the packet to the node D-1 located in the lower hierarchy level in "On control", the node D-1 send the packet to the node A-1 in "Event".

When the node D-1 send the packet to the node C-1 neighbor to the node D-1, the node C-1 determines whether or not pass the packet on the basis of the type of "Event". That is, when the packet is equal to a packet indicative of a previously determined specify event, the node C-1 prevents the packet from passing through the node C-1. In other words, the node C-1 is configured to filter transmission to the node B-1 such that the node C-1 determines whether or not to pass the packet. The event which is passed or not by the node C-1 is determined by the operation and display device.

In addition, when the command has "Service request" and "Configuration request", the packet is transmitted from the nodes in the high side hierarchy level to the nodes in the low side hierarchy level. In this case, the nodes between the source node and the destination node also filter transmission to the nodes such that the node determines whether or not to pass the packet arbitrary. In addition, it is possible for the nodes between the source node and the destination node to perform service instead of the destination node and the source node.

As mentioned above, the nodes between the source node and the destination node filters the packet. Therefore, it is possible to reduce packet count compared to a condition where nodes do not filter the packet. Consequently, it is possible to reduce a processing load of the nodes. For example, when the communication path is determined as "A-1" "B-1" "C-1" "D-1", it is possible for the node C-1 to filter the packet such that the packet is transmitted to the node D-1. In this case, the node A-1 can not receive the service (for example, the measurement information measured by the individual measurement device Ms) with regard to the device under the node D-1. However, the node A-1 is able to receive an integrated service of the nodes D-1, D-2 . . . under the node C-1.

Fourth Embodiment

Figure 12:
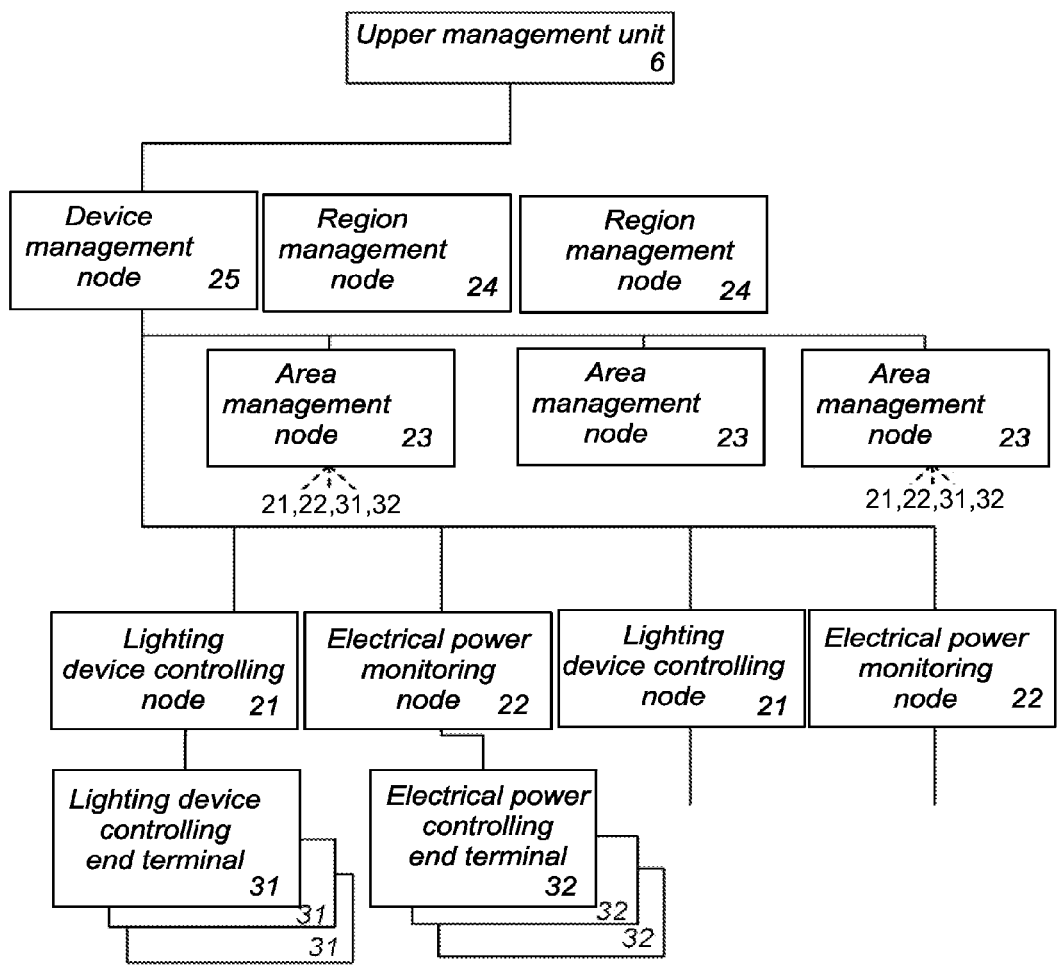
FIG. 12 shows a block diagram of a fourth embodiment.

The third embodiment shows the tree structure system having nodes 21 to 24 cooperative with each other to construct one root. However, it is possible to employ a device management node 25 which acts as a superior node shown in FIG. 12. The device management node 25 is configured to communicate with each the nodes 21 to 24 and the end terminals 31, 32 individually. The device management node 25 is configured to detect the operation condition and the communication condition of the nodes 21 to 23 and the end terminals 31, 32 which individually communicate. The device management node 25 is configured to store the history of the abnormality of the nodes 21 to 23 and the end terminals 31, 32. In addition, the device management node 25 is configured to backup the setting data periodically in a case where the abnormality is caused. That is, device management node 25 acts as the management unit 4 in the first embodiment.

In the illustration, the device management node 25 is not connected to the region management node 24. However, it is possible to connect the device management node to the region management node 24 such that the device management node 25 is located in the low side hierarchy level of the region management node 24. In addition, when a plurality of the region management node 24 is used, it is possible to connect the upper management unit 6 with the region management node 24 and the device management node 25 such that the region management node 24 and the device management node 25 are located in the low side hierarchy level of the upper management unit 6. The upper management unit 6 acting as a topmost node is not required to have the upper management communication unit 15 and the upper setting communication unit 17. The upper management unit 6 has components same as that of the third embodiment except for above. Operation of the upper management unit 6 is same as that of the third embodiment.

The invention claimed is:

1. A device management system for monitoring and/or controlling a plurality of devices through a communication network, said device management system comprising:
 a plurality of terminal units being connected respectively to the devices;
 a plurality of nodes being cooperative with said terminal units to construct the communication network having a logically hierarchized structure, said nodes including a superior node, an internal node connected to said superior node so as to be located in a lower hierarchy level than said superior node, and an inferior node connected to said internal node so as to be located in a lower hierarchy level than said internal node, and
 each said node having an upper communication unit, a lower communication unit, and a memory, said upper communication unit being configured to communicate with said node in a high hierarchy level, said lower communication unit being configured to communicate with said node in a low hierarchy level, said memory holding management information utilized for controlling and/or monitoring the devices,
wherein
 said upper communication units of the nodes respectively have upper management communication units which are configured to transmit management information to the nodes in the high hierarchy level, and
 said lower communication units of the nodes respectively having lower management communication units which are configured to transmit management information to the nodes in the low hierarchy level,
wherein
 the devices are disposed in a predetermined management area which is divided into sub-areas each provided with a local management unit and an area unit,
 said local management unit being defined by said terminal unit establishing the communication network of the low hierarchy level, said area unit being defined by a node which is configured to communicate with the local management unit in order to collect information of said sub-area,
 said system further including an area-separating device which is interposed between said area unit in each said sub-area and said communication network in the high hierarchy level provided with an upper management unit, said area-separating device being configured to avoid a communication packet transmitted between the local management unit and the area unit from leaking into the communication network in the high hierarchy level,
 said area unit being configured to communicate with the upper management unit through the area-separating device,
wherein
 a router that acts as said area-separating device is provided,
 said area unit broadcasts the communication packet to said local management unit
 said router is configured to prevent the broadcasted communication packet from leaking to an outside of said sub-area, and
wherein
 in the communication between said area unit and said upper management unit, said area unit sends a reply demand by HTTP to said upper management unit,
 upon receiving the reply demand, said upper management unit communicates with said area unit to reply to the reply demand, and
 when there is information to send from said area unit to said upper management unit, said area unit sends the information when said area unit issues the reply demand, and
 when there is information to send from said upper management unit to said area unit, said upper management unit sends the information when said upper management unit replies to the reply demand sent by HTTP.

2. The system as set forth in claim 1, wherein
each one of said superior node, said internal node, and said inferior node has a usage communication unit which is connected to an operation and display device, said operation and display device being configured to display contents stored in said memory and also being configured to set said contents stored in said memory.

3. The system as set forth in claim 1, wherein
said upper communication unit further includes an upper setting communication unit,
said upper setting communication unit receives information which is stored in said memory from the communication network in a high hierarchy level,
said lower communication unit further including a lower setting communication unit, said lower setting communication unit being configured to transmit the at least a portion of the information received by the upper setting communication unit to said communication network in a low hierarchy level.

4. The system as set forth in claim 3, wherein
both said upper management communication unit and said lower management communication unit are configured to use a first communication protocol,
said usage communication unit being configured to use a second communication protocol,
said upper setting communication unit and said lower setting communication unit being configured to use a third communication protocol, and
at least two of said first communication protocol, said second communication protocol and said third communication protocol being same to a protocol used in each the nodes.

5. The system as set forth in claim 1, wherein
each the node includes signal processor having a CPU, and
said signal processors are respectively configured to run the same program.

6. The system as set forth in claim 1, wherein
said internal node is configured to pass the information through said internal node and store no information to said memory of said internal node when the internal node receives a packet including a command indicative of passing the information through the internal node.

7. The system as set forth in claim 6, wherein
each said node is configured to transmit the information to the communication network in the high hierarchy level through the upper communication unit only when said lower communication unit of said nodes receives the packet having a predetermined command from said nodes in the low hierarchy level.

8. The system as set forth in claim 1, wherein
said upper management device is configured to send a bulk control instruction of simultaneously controlling a plurality of said devices in each sub-area,
said area unit being configured to designate, upon receiving said bulk control instruction, one of the local management units that manages the devices and send said bulk control instruction to thus designated local management unit,
said local management unit being configured to designate, upon receiving said bulk control instruction, said devices and provide an instruction to thus designated devices for controlling the same in accordance with said bulk control instruction.

9. The system as set forth in claim 1, wherein
said nodes are configured to determine a timing for controlling the devices and are configured to control the devices on said timing when the nodes control the devices under the management of the local management unit in the sub area.

10. A communication network device used by a device management system for monitoring and/or controlling a plurality of devices by a communication network having an high hierarchy level, a medium hierarchy level, and a low hierarchy level, said communication network device is used in the medium hierarchy level, said communication network device comprising,
an upper communication unit, a lower communication unit, and a memory, said upper communication unit is configured to communicate with the communication network device in the high hierarchy level, said lower communication unit being configured to communicate with the communication network device in the low hierarchy level, said memory storing a management information for monitoring and/or controlling the devices, wherein
said upper communication unit includes an upper management communication unit being configured to communicate with the communication network in the high hierarchy level, and
said lower communication unit including a lower management communication unit being configured to communicate with the communication network in the lower hierarchy level,
wherein
the devices are disposed in a predetermined management area which is divided into sub-areas each provided with a local management unit and an area unit,
said local management unit being defined by said terminal unit establishing the communication network of the low hierarchy level, said area unit being defined by a node which is configured to communicate with the local management unit in order to collect information of said sub-area,
said system further including an area-separating device which is interposed between said area unit in each said sub-area and said communication network in the high hierarchy level provided with an upper management unit, said area-separating device being configured to avoid a communication packet transmitted between the local management unit and the area unit from leaking into the communication network in the high hierarchy level,
said area unit being configured to communicate with the upper management unit through the area-separating device,
wherein
a router that acts as said area-separating device is provided,
said area unit broadcasts the communication packet to said local management unit,
said router is configured to prevent the broadcasted communication packet from leaking to an outside of said sub-area, and
wherein
in the communication between said area unit and said upper management unit, said area unit sends a reply demand by HTTP to said upper management unit,
upon receiving the reply demand, said upper management unit communicates with said area unit to reply to the reply demand, and
when there is information to send from said area unit to said upper management unit, said area unit sends the information when said area unit issues the reply demand, and
when there is information to send from said upper management unit to said area unit, said upper management unit sends the information when said upper management unit replies to the reply demand sent by HTTP.

11. The communication network device as set forth in claim 10, wherein
said communication network device further comprises a usage communication unit being connected to an operation and display device, said operation and display device being configured to show contents in said memory, and being configured to set the contents stored in said memory.

12. The communication network device as set forth in claim 10, wherein
said communication network device is configured to pass the information and store no information to said memory when the communication network device receives a packet including a command indicating a pass of the information.

13. The communication network device as set forth in claim 12, wherein
said communication network device is configured to send the information to the communication network in the high hierarchy level through the upper communication unit only when each said communication unit of said communication network device receives a packet having a predetermined command from the communication network device in the low hierarchy level.

* * * * *